US010102428B2

(12) United States Patent
Loveland et al.

(10) Patent No.: US 10,102,428 B2
(45) Date of Patent: Oct. 16, 2018

(54) SYSTEMS AND METHODS FOR SURFACE AND SUBSURFACE DAMAGE ASSESSMENTS, PATCH SCANS, AND VISUALIZATION

(71) Applicant: Loveland Innovations, LLC, Alpine, UT (US)

(72) Inventors: Jim Loveland, Alpine, UT (US); Leif Larson, Alpine, UT (US); Dan Christiansen, Alpine, UT (US); Tad Christiansen, Alpine, UT (US); Cam Christiansen, Alpine, UT (US)

(73) Assignee: Loveland Innovations, LLC, Pleasant Grove, UT (US)

( * ) Notice: Subject to any disclaimer, the term of this patent is extended or adjusted under 35 U.S.C. 154(b) by 0 days.

(21) Appl. No.: 15/796,672

(22) Filed: Oct. 27, 2017

(65) Prior Publication Data
US 2018/0247121 A1    Aug. 30, 2018

Related U.S. Application Data

(63) Continuation of application No. 15/444,164, filed on Feb. 27, 2017, now Pat. No. 9,805,261.

(51) Int. Cl.
*G06K 9/00*    (2006.01)
*G05D 1/00*    (2006.01)
(Continued)

(52) U.S. Cl.
CPC ........ *G06K 9/00637* (2013.01); *B64C 39/024* (2013.01); *G05D 1/0038* (2013.01);
(Continued)

(58) Field of Classification Search
CPC ........... G06Q 10/0635; G06Q 30/0185; G06Q 40/108; G06Q 30/0283; G06Q 50/16
See application file for complete search history.

(56) References Cited

U.S. PATENT DOCUMENTS 5,721,691 A    2/1998  Wuller
6,037,945 A    3/2000  Loveland
(Continued)

FOREIGN PATENT DOCUMENTS

WO    2016/053438    4/2016
WO    2018089268     5/2018

OTHER PUBLICATIONS

U.S. Appl. No. 15/446,202, Non-Final Office Action dated Feb. 22, 2018.
(Continued)

*Primary Examiner* — Wesley J Tucker
(74) *Attorney, Agent, or Firm* — Phillips, Ryther & Winchester; Justin Flanagan

(57) ABSTRACT

An unmanned autonomous vehicle assessment and reporting system may conduct patch scan analyses of a roof. Damage points on the roof may be evaluated for severity and assigned a severity value. A remediation status may be objectively developed for one or more faces of the roof based on the number of damage points within a patch region of a defined size and the severity value of each of the damage points within the patch region. A visualization system may overlay markings, such as color-coded markings, to display a representation of a roof, patch regions, damage points, and/or severity values.

20 Claims, 15 Drawing Sheets

(51) Int. Cl.
*B64C 39/02* (2006.01)
*G06T 17/05* (2011.01)
*G06K 9/62* (2006.01)
*G06K 9/20* (2006.01)
*G06Q 10/00* (2012.01)

(52) U.S. Cl.
CPC .......... *G06K 9/2081* (2013.01); *G06K 9/6202* (2013.01); *G06Q 10/20* (2013.01); *G06T 17/05* (2013.01); *B64C 2201/123* (2013.01); *B64C 2201/146* (2013.01); *G06T 2200/08* (2013.01)

(56) References Cited

U.S. PATENT DOCUMENTS

| | | | |
|---|---|---|---|
| 6,810,383 | B1 | 10/2004 | Loveland |
| 6,816,819 | B1 | 11/2004 | Loveland |
| 6,826,539 | B2 | 11/2004 | Loveland |
| 6,829,584 | B2 | 12/2004 | Loveland |
| 7,363,157 | B1 | 4/2008 | Hanna |
| 7,447,564 | B2 | 11/2008 | Yasukawa |
| 7,868,812 | B2 | 1/2011 | Huthoefer |
| 8,078,436 | B2 | 12/2011 | Pershing |
| 8,159,662 | B2 | 4/2012 | Rezac |
| 8,170,840 | B2 | 5/2012 | Pershing |
| 8,209,152 | B2 | 6/2012 | Pershing |
| 8,229,768 | B1 | 7/2012 | Hopkins, III |
| 8,345,578 | B2 | 1/2013 | Thoumy |
| 8,346,578 | B1 | 1/2013 | Hopkins, III et al. |
| 8,380,349 | B1 | 2/2013 | Hickman |
| 8,473,125 | B2 | 6/2013 | Rischmuller |
| 8,542,880 | B2 | 9/2013 | Thornberry |
| 8,718,838 | B2 | 5/2014 | Kokkeby |
| 8,818,572 | B1 | 8/2014 | Tofte |
| 8,818,770 | B2 | 8/2014 | Pershing |
| 8,823,732 | B2 | 9/2014 | Adams |
| 8,825,454 | B2 | 9/2014 | Pershing |
| 9,036,861 | B2 | 5/2015 | Chen |
| 9,075,415 | B2 | 7/2015 | Kugelmass |
| 9,098,655 | B2 | 8/2015 | Plummer |
| 9,116,003 | B2 | 8/2015 | Khorashadi |
| 9,129,376 | B2 | 9/2015 | Pershing |
| 9,135,737 | B2 | 9/2015 | Pershing |
| 9,152,863 | B1 | 10/2015 | Grant |
| 9,162,753 | B1 | 10/2015 | Panto |
| 9,201,422 | B2 | 12/2015 | Ohtomo |
| 9,251,417 | B1 | 2/2016 | Xu |
| 9,501,061 | B2 | 11/2016 | Canoy |
| 9,501,700 | B2 | 11/2016 | Loveland |
| 9,505,494 | B1 | 11/2016 | Marlow |
| 9,513,635 | B1 | 12/2016 | Bethke |
| 9,563,201 | B1 | 2/2017 | Tofte |
| 9,609,288 | B1 | 3/2017 | Richman |
| 9,613,538 | B1 | 4/2017 | Poole |
| 9,618,940 | B1 | 4/2017 | Michini |
| 9,639,960 | B1 | 5/2017 | Loveland |
| 9,734,397 | B1 | 8/2017 | Larson |
| 9,805,261 | B1 | 10/2017 | Loveland |
| 9,823,658 | B1 | 11/2017 | Loveland |
| 9,978,149 | B1 | 5/2018 | Zhang |
| 2002/0013644 | A1 | 1/2002 | Mekemson et al. |
| 2002/0169664 | A1 | 11/2002 | Walker et al. |
| 2003/0033242 | A1 | 2/2003 | Lynch et al. |
| 2003/0210168 | A1 | 11/2003 | Ruszkowski, Jr. |
| 2004/0066917 | A1 | 4/2004 | Yasukawa |
| 2004/0167667 | A1 | 8/2004 | Goncalves |
| 2004/0167861 | A1 | 8/2004 | Hedley |
| 2004/0177373 | A1 | 9/2004 | Kawabe et al. |
| 2005/0267657 | A1 | 12/2005 | Devdhar |
| 2006/0133661 | A1* | 6/2006 | Takeda ............ G01N 21/95607 382/149 |
| 2007/0233367 | A1 | 10/2007 | Chen |
| 2009/0201190 | A1 | 8/2009 | Huthoefer |
| 2009/0265193 | A1 | 10/2009 | Collins |
| 2010/0215212 | A1 | 8/2010 | Flakes |
| 2010/0277588 | A1 | 11/2010 | Ellsworth |
| 2010/0277723 | A1 | 11/2010 | Rezac |
| 2012/0237083 | A1 | 9/2012 | Lange |
| 2013/0216089 | A1 | 8/2013 | Chen |
| 2013/0325244 | A1 | 12/2013 | Wang |
| 2014/0153773 | A1 | 6/2014 | Gupta |
| 2014/0168420 | A1 | 6/2014 | Naderhirn |
| 2014/0316614 | A1 | 10/2014 | Newman |
| 2014/0316616 | A1 | 10/2014 | Kugelmass |
| 2014/0324405 | A1 | 10/2014 | Plummer |
| 2014/0336928 | A1 | 11/2014 | Scott |
| 2015/0019267 | A1 | 1/2015 | Prieto |
| 2015/0148955 | A1 | 5/2015 | Chin |
| 2015/0220085 | A1 | 8/2015 | Ohtomo |
| 2015/0225081 | A1 | 8/2015 | Kespry |
| 2015/0348204 | A1 | 12/2015 | Daues |
| 2015/0371346 | A1 | 12/2015 | Frendling |
| 2015/0377405 | A1 | 12/2015 | Down |
| 2016/0004795 | A1 | 1/2016 | Novak |
| 2016/0148363 | A1 | 5/2016 | Phan |
| 2016/0246304 | A1 | 8/2016 | Canoy |
| 2016/0247115 | A1 | 8/2016 | Pons |
| 2016/0253808 | A1 | 9/2016 | Metzler |
| 2016/0257424 | A1 | 9/2016 | Kespry |
| 2016/0272308 | A1 | 9/2016 | Gentry |
| 2016/0292872 | A1 | 10/2016 | Hammond |
| 2016/0301859 | A1 | 10/2016 | Tebay |
| 2016/0307447 | A1 | 10/2016 | Johnson |
| 2016/0321503 | A1 | 11/2016 | Zhou |
| 2016/0327959 | A1 | 11/2016 | Brown |
| 2016/0347462 | A1 | 12/2016 | Kespry |
| 2016/0363929 | A1 | 12/2016 | Kespry |
| 2016/0365825 | A1 | 12/2016 | Poivet |
| 2016/0377424 | A1 | 12/2016 | Clark |
| 2017/0053169 | A1 | 2/2017 | Cuban |
| 2017/0090481 | A1 | 3/2017 | Kespry |
| 2017/0123035 | A1 | 5/2017 | Kespry |
| 2017/0146344 | A1 | 5/2017 | Kespry |
| 2017/0193829 | A1 | 7/2017 | Bauer |
| 2017/0249510 | A1* | 8/2017 | Labrie ............... G06K 9/00637 |
| 2017/0270612 | A1* | 9/2017 | Howe ................ G06Q 40/08 |
| 2017/0270650 | A1* | 9/2017 | Howe ................ G06T 7/001 |

OTHER PUBLICATIONS

U.S. Appl. No. 15/708,471, Non-Final Office Action dated Jan. 5, 2018.
PCT Application No. PCT/US2017/059990, International Search Report dated Jan. 29, 2018.
PCT Application No. PCT/US2017/059990, Written Opinion dated Jan. 29, 2018.
U.S. Appl. No. 15/446,202, Notice of Allowance dated Jul. 5, 2018.
USPTO Non-final Office Action; U.S. Appl. No. 15/388,754; dated May 26, 2017.
USPTO Non-final Office Action; U.S. Appl. No. 15/360,630; dated Apr. 13, 2017.
USPTO Non-final Office Action; U.S. Appl. No. 15/480,310; dated May 15, 2017.
USPTO Final Office Action; U.S. Appl. No. 15/444,164; dated Jul. 14, 2017.
USPTO Notice of Allowance; U.S. Appl. No. 15/360,630; dated Jun. 21, 2017.
USPTO Notice of Allowance; U.S. Appl. No. 15/360,641; dated Mar. 17, 2017.
USPTO Notice of Allowance; U.S. Appl. No. 15/388,754; dated Oct. 5, 2017.
Autonomous MAV—Cues, Cooper Bills et al., IEEE, 978-1-61284-385-8, 2011, pp. 5776-5783.
Unmanned—Monitoring, C. Eschmann et al., ResearchGate, 2012, pp. 1-8.
USPTO Final Office Action; U.S. Appl. No. 15/446,202; dated Nov. 8, 2017.
USPTO Non-final Office Action; U.S. Appl. No. 15/444,164; dated Apr. 21, 2017.

(56) References Cited

OTHER PUBLICATIONS

USPTO Non-final Office Action; U.S. Appl. No. 15/446,202; dated Jun. 28, 2017.

* cited by examiner

Estimate

Type of Roofing: Asphalt Shingles
Total Square Footage: 1700
Total Damage Points: 33
Total Roof Faces: 4
Roof Faces Needing Replacement: 3
Square Footage Needing Replacement: 1275
Square Footage Needing Repair: 300
Average Damage: Moderate
Cost Per Square Foot: $7.00

Total Cost: $8925.00

Back | Calculate Tax | View Insurance Login | Continue to Payment

FIG. 11

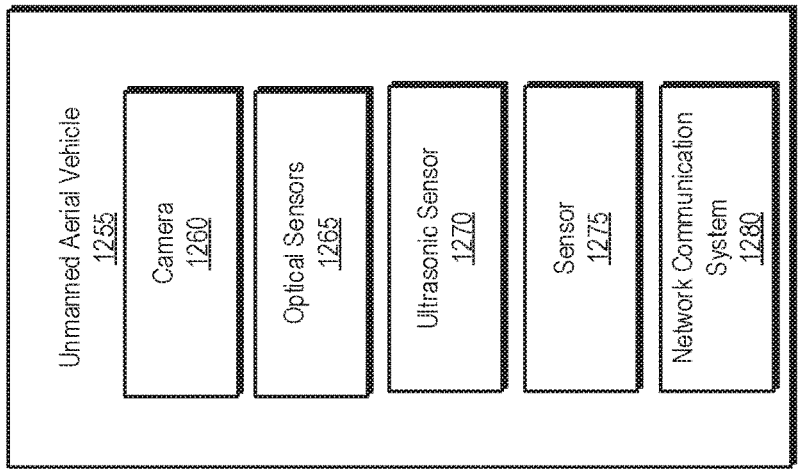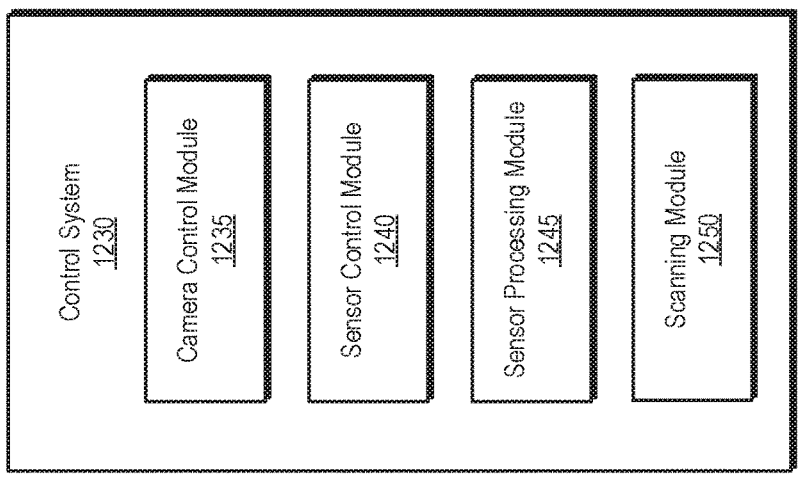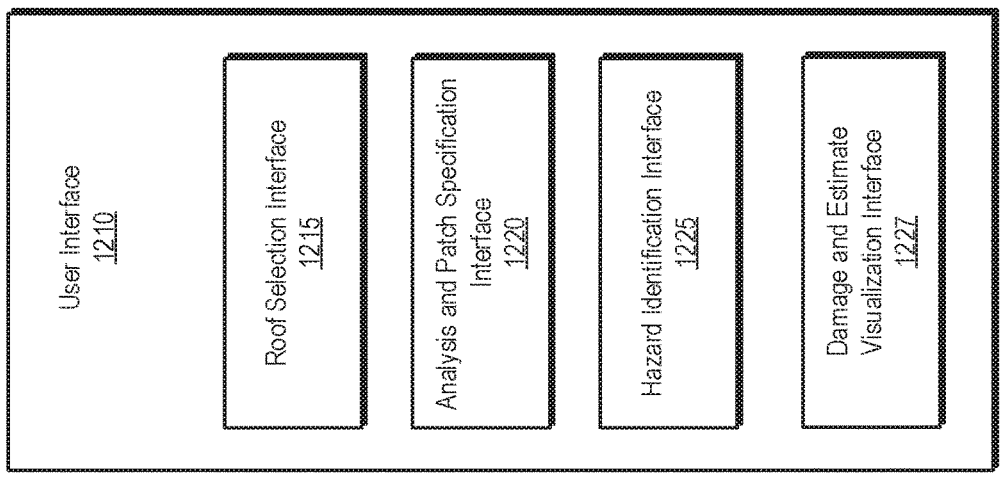
FIG. 12

SYSTEMS AND METHODS FOR SURFACE AND SUBSURFACE DAMAGE ASSESSMENTS, PATCH SCANS, AND VISUALIZATION

RELATED APPLICATIONS

This application is a continuation of patent application Ser. No. 15/444,164 filed Feb. 27, 2017 and titled "SYSTEMS AND METHODS FOR SURFACE AND SUBSURFACE DAMAGE ASSESSMENTS, PATCH SCANS, AND VISUALIZATION," which application is incorporated herein by reference in its entirety.

TECHNICAL FIELD

This disclosure generally relates to systems and methods for autonomous surface and subsurface structural analyses, inspections, reporting, and remediation estimates. Specifically, this disclosure relates to real-time surface and subsurface analysis, such as roof surfaces and subsurfaces, using autonomous vehicles and associated reporting and visualization systems.

BRIEF DESCRIPTION OF THE DRAWINGS

Non-limiting and non-exhaustive embodiments of the disclosure are described herein, including various embodiments of the disclosure with reference to the figures listed below.

FIG. 11 illustrates an estimate of repairs based on patch scan analyses and a roof type analysis presented on an electronic computing device, according to various embodiments.

FIG. 12 illustrates a block diagram of a UAV roof analysis system for analyzing a roof and presenting the results of the analysis, according to one embodiment.

DETAILED DESCRIPTION

Figure 1A:
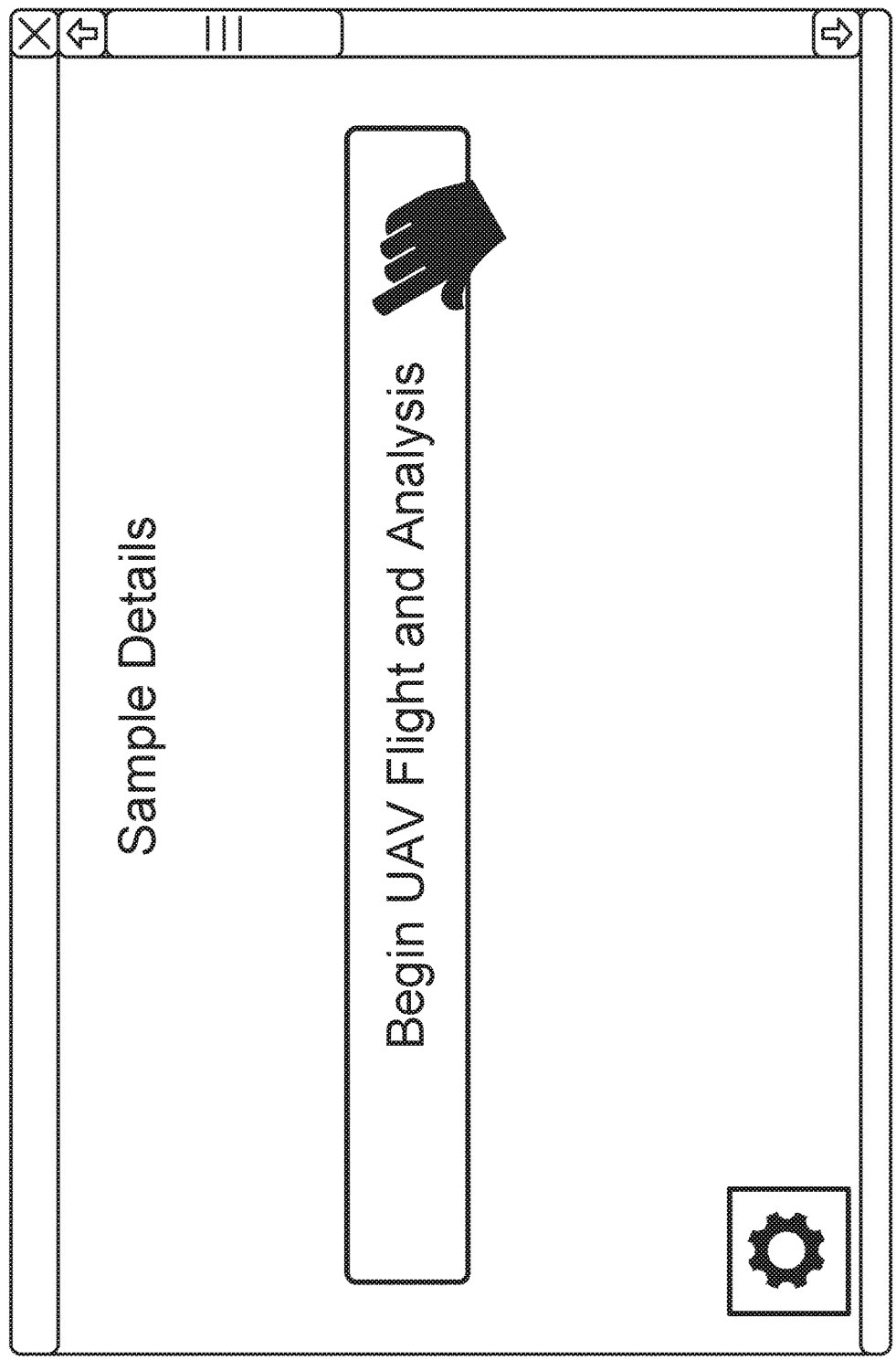
FIG. 1A illustrates an example of a user interface for initiating a default UAV roof analysis from an electronic computing device, according to one embodiment.

Roof damage assessment and remediation estimates generally require a human assessor to scale a ladder to examine a roof. The assessor may attempt to follow a set of guidelines during the assessment in an attempt to provide systematic and uniform reports and estimates. It is widely recognized that there is some subjectivity to these types of analyses and difficulty in producing uniform and objective results. For this reason, it is not uncommon to find that an agent of a roof repair company may report that there is more damage to a roof than an insurance adjuster might report. Uniformity in the assessment is difficult due to human biases and subjective analysis techniques.

The assessor may also have a difficult time showing an owner, or other interested person, what exactly is wrong with a roof. Photographs taken with handheld cameras from atop the roof are often devoid of context and lack sufficient detail to convey convincing or understandable evidence of damage to an owner or other interested party. For example, a homeowner may find a photograph of a group of shingles devoid of the context necessary to draw their own conclusions. Similarly, a soft spot caused by water damage photographed using a handheld camera from on top of the roof may not convey sufficiently meaningful information to a party of interest because it lacks the context of the surrounding roof.

Moreover, the number and types of people that can act as agents, assessors, adjustors, etc. is limited because these individuals must be able to scale a ladder and perform a roof analysis. In many instances, this limits the number and types of people that can act as assessors and/or agents for owners, insurance companies, roofing companies, government analysts, and others that may have an interest in evaluating a roof. For example, while a person may be a good salesperson, insurance agent, or adjuster, if they are unwilling or incapable of scaling a ladder and walking around on a roof, they may not be able to perform the necessary tasks.

This disclosure provides methods and systems for assessing damage on roofs of residential, commercial, and industrial buildings, including, but not limited to, single-family homes, condominiums, townhomes, office buildings, industrial buildings, sheds, storage units, and other structures with roofs on them. The systems and methods described herein for assessing damage on a roof include the use of autonomously controlled unmanned aerial vehicles (UAVs) to ensure that roof analyses are systematic and uniform. This disclosure also provides systems and methods for visualizing damage assessments, determining roofing materials, and producing systematic and uniform remediation estimates.

A UAV may carry an imaging system to capture multiple images of the roof. The UAV may capture visible light images, infrared images, and/or ultraviolet images. Other sensor types may be used as well, including, but not limited to moisture sensors, ultrasonic sensors, LIDAR, RADAR, etc. False color representations may be generated for visualizing sensor data from non-visible spectrum image sensors.

The systems and methods described herein may be implemented by an owner of the roof or an agent of a company (including a representative, contractor, or employee thereof). Examples of companies that might utilize the systems and methods described herein include, but are not limited to, an insurance company, a roofing company, a damage assessment company, an inspector, a government analyst, an appraiser, or other property valuation, evaluation, assessment, or repair company.

In various embodiments, an agent may function as an operator of the UAV and utilize a remote control system, such as a personal computer or personal electronic device. Examples of such devices include watches, tablets, and mobile phones. An operator may use the computing device to initiate a roof assessment via a software program. In some embodiments, the agent may use the software program to select a standard assessment model, a desired sample size (e.g., patch regions dimensions for a patch scan analysis), and/or a desired scope of the assessment. In some embodiments, the agent may begin the UAV assessment by placing the UAV in a safe location for takeoff and selecting a "start" or "begin" icon on the computing device.

The UAV may be programmed to perform an analysis of the nearest roof or one or more roofs based on a selection by the operator. For instance, the operator may use satellite images or real-time nadir images from the UAV to select one or more structures having one or more roofs for the UAV to analyze.

In some embodiments, the UAV may initially position itself above the selected roof(s) to capture nadir images of the roof(s) and/or associated structures. The UAV may subsequently follow a boustrophedonic flight path while the imaging system captures a series of images and/or collects non-visible image scan information. The UAV may subsequently position itself at various altitudes and angles relative to the roof to collect oblique images at one or more heights and/or relative to each face of the roof. To facilitate subsequent rendering of a three-dimensional model, the UAV may perform a loop scan of the roof while the imaging system captures a set of oblique images. For additional detailed images of the roof, the UAV and imaging system may perform a series of micro scans, sometimes referred to as detailed micro scans or microscans. A microscan may consist of or include a patch scan analysis of a patch region with defined dimensions Using the collection of images, a rendering system may generate interactive models of the roof and/or optionally the underlying structure.

In various embodiments, UAV hardware, firmware, and/or software may be modified, upgraded, and/or programmed to perform the functions, methods, and behaviors described herein. In some embodiments, software, hardware, and/or firmware may be created to interface with pre-existing UAV interfaces. Such hardware and software may be integrated into the UAV, into a portable computing device used by the agent (or homeowner), or be cloud-based and accessible to one or both of the UAV and the portable computing device.

In some embodiments, modifications to one or more portions of a UAV may be made to accomplish the described systems and methods. Hardware, firmware, and/or software may also be used in conjunction with a UAV to extend or replace its capabilities to implement any of the embodiments described herein. In some embodiments, multiple UAVs may be utilized that together provide the desired feature set for a particular application. For example, one UAV may be used for infrared scanning and a different UAV may be used for visible image captures. In some embodiments, the same UAV may be used, but the operator may swap sensor systems during various portions of the scan (e.g., halfway through a scan, an operator may remove a visible spectrum camera and replace it with an infrared camera).

While many of the examples described herein relate to damage assessments and roof replacement repair estimates, similar technology and approaches could be used with minor adaptations for use by rooftop installers, such as satellite dish installers, solar panel installers, swamp cooler installers, antenna installers, and the like.

In some embodiments of the present disclosure, a technician may manually operate a UAV to navigate it around the structure while the UAV autonomously captures the needed data for a desired assessment. In many embodiments, the use of a UAV facilitates and/or augments the services provided by a human, it does not necessarily replace the human role. For example, usage of the systems and methods described herein allow an insurance company or roofing company to send an agent skilled in customer relations and/or sales, regardless of whether that person has training in roof damage analysis or roofing estimates.

A UAV roof analysis system, according to various embodiments described herein, provides a comprehensive, automatic (or at least semi-automatic), and methodical approach for assessing damage on a roof and/or for providing an estimate for remediation of the roof. The types of assessments, reports, and images collected may vary based on a specific application. Generally, the approaches obviate the need for an industry specific trained technician to be present, or at least greatly reduce the workload of such a technician.

The UAV roof analysis system may include a site selection interface to receive an electronic input identifying a location of a roof or roofs. The UAV roof analysis system may also include a hazard selection interface to receive electronic input identifying geographic hazards such as aboveground power lines, tall trees, neighboring structures, etc. In various embodiments, the UAV assessment and reporting system may be preloaded geographic hazard models. The UAV roof analysis system may allow for these hazards to be eliminated from the flight plan to produce a safe path for automated imagery and data capture. The selection of the roof(s) and/or hazards may be performed through an interface on the agent's computing device using satellite images, in real-time based on images transmitted by the UAV, and/or on a previously captured nadir image of a site. Onboard sensors for obstacle avoidance may additionally or alternatively be used for the detection of hazardous obstacles, especially in situation in which incomplete geographic information is available and periodic changes are expected.

As previously noted, the UAV may include a visible spectrum camera to capture images of the structure, sonar sensors, LIDAR sensors, infrared sensors, optical sensors, radar sensors, and the like. The UAV may include one or more onboard processors and/or communication interfaces to communicate with a controller, the computing device, and/or a cloud-based software program. The UAV and/or the agent's computing device may include a non-transitory computer-readable medium for receiving and storing instructions that, when executed by the processor, cause the UAV to conduct a roof analysis, as described herein. The roof analysis may include a boustrophedonic scan of the roof. The boustrophedonic scan may include capturing images during a boustrophedonic flight pattern within a first altitude range. The boustrophedonic scan may also or alternatively include determining distances to a surface for each of a plurality of potential vertical approaches within a defined area.

The UAV roof analysis system may identify a structure on the site using the boustrophedonic scan of the area. The UAV roof analysis system may additionally or alternatively perform a loop scan of the roof. The loop scan may include a second flight pattern for the UAV to travel around the perimeter of the roof. The second flight pattern may be at a second altitude range lower than the first altitude range. Finally, the UAV roof analysis system may conduct one or more patch scan analyses on one or more of the faces of the roof in a third flight pattern that includes vertical, angular, or horizontal approaches to the roof to capture detailed images of the roof.

In various embodiments, a roof selection interface on the agent's computing device may receive, from the operator/agent, an electronic input identifying a roof. The operator may mark, via an electronic input on a roof identification interface, one or more boundaries associated with the roof, structure, and/or site. The operator may also identify, on the operator client, obstacles, boundaries, structures, and particular points of interest.

For example, an operator who is attempting to scan a residential lot may be presented with a satellite image on a tablet. The operator may select each corner of the lot to identify the boundaries of the lot. The operator may additionally or alternatively drag a finger or stylus along the outline of roof, or faces of each roof section, to mark the perimeter of the roof, or roof faces. Further, if the lot has trees or other obstacles, the operator may press and hold to identify their location and enter an estimated height. The operator may also emphasize certain portions or faces of the roof for analysis, for enhanced analysis, or to be excluded from analysis. For instance, if the operator is collecting data for an insurance claim on a house that is known to have experienced potentially damaging hail from a northwest direction, the operator may highlight the north-facing and west-facing surfaces of the roof for analysis.

A UAV may begin an analysis of a roof with a defined scanning plan to evenly scan a roof or section of a roof. During a previously defined flight plan, a UAV may detect damage through the use of artificial intelligence (AI), computer vision analysis techniques, and/or through library-matching techniques as described herein. The detected damage may be analyzed according to a ruleset and result in the UAV altering the types of scanning being performed, the level of detail being collect, and/or modify or alter a flight path in real time. Accordingly, real-time modifications to a scanning or navigation pattern may allow for more accurate and/or enhanced (e.g., more detailed) scan data to be collected on an as-needed basis.

In some embodiments, the UAV roof analysis system may automatically identify obstacles, boundaries, structures, and particular points of interest using satellite images, county records, topographical maps, and/or customer statements. For example, the UAV roof analysis system may receive an address of a commercial property to be assessed for damage caused by a tornado. The UAV roof analysis system may use available county records to determine the boundary of the property and location of the roof-bearing structure(s) thereon, and topographical maps of the area to identify objects and structures.

After a roof is identified automatically or manually, the UAV may, optionally, capture a nadir image (i.e., top down) of the entire site. The UAV roof analysis system may use the nadir image to align the UAV with landmarks established in the initial identification of the site, structure, and/or roof. The UAV roof analysis system may also use the nadir image to generate a flight pattern or adjust a predefined flight pattern to ensure accuracy and uniformity. The flight pattern may include any combination of three flight stages: (1) a boustrophedonic scan, (2) a loop scan, and (3) a micro scan that optionally includes patch scan analyses. In some embodiments, a roof analysis may require only one or two of the three types of scans. Thus, in some embodiments, one or more stages may be omitted. For instance, in some situations the roof may be identified during semi-autonomous navigation of the UAV by the operator. Patch scans of one or more faces of the roof may then be automatically performed.

For instance, in a basic implementation, an operator may manually navigate a UAV to a location proximate a face of a roof. Autonomously, or in response to an operator request, the UAV roof analysis system may conduct a patch scan analysis of the roof face. In some embodiments, the UAV system may direct the operator to (1) navigate the UAV up, down, left, right, forward, or backward and/or (2) change the angle of a sensor system (e.g., camera) on the UAV to facilitate a patch scan analysis. In another embodiment, once the UAV has been positioned proximate a face of a roof by an operator, a "perform patch analysis" button may be selected and the UAV roof analysis system may autonomously navigate the UAV to the correct location by making minor positional adjustments and/or adjust sensor systems as needed to perform one or more patch scan analyses on the face of the roof. In still other embodiments, as described herein, the entire processes from takeoff to landing may be automated and patch scan analysis(es) may be conducted for one or more faces of the roof of a structure.

In embodiments utilizing a boustrophedonic scan, the UAV may follow a flight pattern where the UAV travels from edge to edge of the site or roof edges in alternating offset zones (or slightly beyond each edge of a roof or slightly less than each edge of a roof). The camera or other sensing system on the UAV may capture images of the roof as the UAV travels in the boustrophedon pattern. The UAV roof analysis system may merge the images to form a detailed aerial view of the roof and/or underlying structure and site. The level of detail in the detailed aerial view may be improved by lowering the altitude of the UAV and using minimal offsets. However, the altitude used for a boustrophedonic scan may be limited due to the height of structures and obstacles on the site.

In some embodiments, the boustrophedonic scan alone may be used to develop a top-down or aerial view of the roof. In other embodiments, the images and scan information obtained during the boustrophedonic scan may be combined with other available data or used to refine other available data. The scan information may, as previously described, include information from optical imaging systems, ultrasonic systems, radar, LIDAR, infrared imaging, moisture sensors, and/or other sensor systems.

During a second scan stage, the UAV may perform a loop scan to analyze the angles of a structure. The loop scan may include a flight pattern that positions the UAV at the perimeter of the structure and/or the site. The loop scan may include the UAV traveling around the perimeter. As the UAV travels around the perimeter, the UAV may lower its altitude for sensor system to capture images of the roof at one or more angles. The angles at which sensor data is captures may be oblique or perpendicular to the face(s) of the roof laterally and/or vertically. The UAV roof analysis system may use these images to create a three-dimensional model of the structure.

In one embodiment, the UAV may make multiple passes around the perimeter of the structure at different altitudes. For example, the UAV may fly around the perimeter at a first altitude to capture images of the structure at a first vertical angle, and then fly around the perimeter at a second altitude to capture additional images of the structure at a second vertical angle. The images may be captured at the two vertical angles with the sensors horizontally perpendicular or oblique to the faces of the roof. The number of passes around the perimeter and the lowering of UAV altitude after each pass may vary based on a desired assessment or report. Each additional pass may provide more accurate and/or supplemental images for a three-dimensional model, construction assessment, solar panel installation assessment, and/or damage assessment. It is appreciated that the term "image" is used broadly herein to include visible-spectrum images as well as 'images' captured using alternative sensor types, such as infrared, ultraviolet, and ultrasonic sensor systems.

During a third scan stage, the UAV may perform a micro scan for close up extremely detailed data capture of the roof using one or more sensors and/or sensor types. For examples, tens, hundreds, thousands, or even millions of pixels of sensor data may be used to capture each square inch of a roof or other surface or subsurface. The level of detail far exceeds that available via other types of aerial imaging for a given sensor system. The micro scan may include patch scans of one or more faces of the roof. The micro scan of the roof may provide detailed images (visible spectrum or otherwise) for analyzing the roof. The granularity from the micro scan may assist in detailed measurements, damage identification, and material identification. For example, the micro scan may allow an insurance adjuster to zoom in on a three dimensional model of the structure to view and assess a patch of roof with a predetermined size and/or shape.

A patch scan may comprise an analysis of a region of a roof having a predetermined square footage, size, shape, and/or relative location. The patch scan analysis may identify damage, assess the severity of the damage, identify colors, materials, etc. An assessment of the severity of the damage is not subjective. Rather, the severity of the damage may be categorized based on material type and be objectively associated with a loss of life expectancy, reduced structural integrity, water permeability, loss in insulation qualities, loss of reflective qualities, and/or an objective loss of aesthetic appeal (e.g., a percentage of pixels mismatched as compared to an undamaged portion of the roof). Thus, in a basic embodiment the size of a damage point alone may be used to assign a severity value to the damage point.

One or more of the scan stages described herein may be performed multiple times, or alternatively omitted from the process. For example, in one embodiment the flight pattern may include a boustrophedonic scan. Information gained during the boustrophedonic scan may be used to perform a loop scan. Information gained during the loop scan may be used to perform a more accurate boustrophedonic scan. That process may be repeated as many times as is desired or necessary to obtain sufficient information about a property or structure to perform a suitably detailed or accurate micro scan with patch analysis(es) on one or more faces of the roof.

In one embodiment, to perform the patch scans, the UAV may perform a series of vertical descents toward the rooftop or alternatively horizontal approaches to the rooftop. For instance, the UAV may begin in a starting position at the base altitude (or horizontal distance) and lower its altitude (or decrease its horizontal distance) until it is at a target distance from the rooftop. In one embodiment, the camera or other sensor system on the UAV may capture an image when the target distance is reached. In another embodiment, the camera may take a set of images as the UAV approaches the rooftop. After the image at the target distance is captured, the UAV may return to the further distance and travel a target lateral distance and once again approach that roof to a target distance. In some embodiments, the images may slightly overlap to ensure coverage of the entire structure. In other embodiments, a single patch scan (or other predefined number of patch scans) from each face of the roof may be sufficient. The UAV may continue to perform approaches separated by a defined lateral distance until the entire rooftop has been assessed or until the desired number of patch scans per face of the roof have been completed.

While compatibility with industry standard patch sizes may be useful in some embodiments, in other embodiments it may be preferred to conduct a detailed analysis of the entire structure or entire roof. Moreover, computer vision techniques, computer learning algorithms, and/or artificial intelligence techniques may be employed in combination with one or more of the embodiments described herein. For example, in some embodiments, computer vision (CV) techniques may be employed to detect damage of both interior and exterior surfaces and sub-surfaces of a structure. Examples of these techniques include, but are not limited to, pattern recognition, edge detection, measurements, ratio analysis, etc.

Thus, while traditional patch analysis requires a human adjuster to inspect a roof and draw a 10'×10' sample using chalk, this is largely to reduce the workload of the adjuster or other evaluator. The thought is that the sample is large enough to be representative of the rest of the roof and so there is no need to do a complete analysis. This can lead to inaccurate conclusions, incorrect repairs, and time and money being spent for naught. Using the systems and methods described herein, real-time adaptive analysis of an entire roof or entire face of a roof may be performed. For instance, the systems and methods described herein may be used to automatically detect damage, such as hail, over the entire surface of the roof thereby eliminating the need for a manual inspection process.

In various embodiments, each patch scan may be performed with image sensors orthogonal to the rooftop at a center of the patch scan. For instance, a 10'×10' patch scan may comprise positioning the UAV a predefined distance from the surface of the roof at a center point of the 10'×10' patch with the sensor(s) orthogonal to the patch of roof.

In another embodiment, to perform the micro scan, the UAV may traverse the rooftop at a target lateral distance and sensors may capture images and other sensor data as the UAV travels in a boustrophedonic or loop pattern. To avoid a collision, the UAV may use integrated sensors and/or data captured during a prior loop scan or boustrophedonic scan.

In some embodiments, a UAV may utilize artificial intelligence, computer vision techniques, and/or computer learning algorithms to optimize a flight plan and navigate safes during each flight based on real-time scanning and sensor data. Each subsequent flight or scanning session may be used to update a knowledge base of hazards and other features of a property or flight pattern.

In one embodiment, the UAV may include proximity sensors. The proximity sensors may be used to avoid obstacles on and surrounding the roof and thereby identify safe flight areas above and proximate the roof and surrounding objects. The proximity sensors may also be used to determine how close the UAV is to the structure. For example, a UAV may be programmed to capture images at a distance of five feet from the structure. The proximity sensors may send a signal indicating to the UAV that it has reached the target distance, five feet, and the camera may capture sensor data in response to the signal. The target distance may be adjusted based on desired detail, weather conditions, surface obstacles, camera resolution, camera field of view, and/or other sensor qualities. In some embodiments, infrared and other non-optical sensors may be used to provide additional assessment data. For example, materials may be identified based on a spectral analysis and/or damage may be identified based on infrared leaks in a structure.

In other embodiments, the UAV may use additional and/or alternative methods to detect proximity to obstacles and the structure. For example, the UAV may use topographical data. As another example, the UAV may have a sonar system that it uses to detect proximity.

Additionally, in some embodiments, the UAV roof analysis system may perform multiple micro scans with different levels of resolution and/or perspective. For example, a first micro scan with patch analysis may provide detailed images at 10 or 20 feet above a roof. Then a second micro scan with patch analysis may image a portion of the roof at five feet for additional detail of that section. This may allow a faster capture of the roof overall while providing a more detailed image set of a portion of interest. In one embodiment, the UAV roof analysis system may use the first micro scan to determine the portion to be imaged in the second micro scan.

In some embodiments, the UAV roof analysis system may use each scan stage to improve the next scan stage. For example, the first scan stage may identify the location of objects. Sonar or optical sensors may be used in the first scan stage to identify the height of the objects and/or physical damage. The location and height of the objects identified in the first scan stage may determine where the loop scan occurs and the altitude at which the angled images are captured. Further, the first and second stages may identify particular points of interest. The third stage may use the particular points of interest to determine the location of the micro scans. For example, during a loop scan, the autonomous flying system may identify wind damage on an east-facing portion of the roof. The micro scan may then focus on the east-facing surface of the roof. The identification of particular points of interest may be done using UAV onboard image processing, server image processing, or client image processing.

The UAV roof analysis system may automatically calculate a pitch of a roof. In a first embodiment, the UAV roof analysis system may use the UAV's sonar or object detection sensors to calculate the pitch of the roof. For example, the UAV may begin at an edge of the roof and then travel toward the peak. The pitch may then be calculated based on the perceived Doppler effect as the roof becomes increasingly closer to the UAV as it travels at a constant vertical height. In a second embodiment, the UAV may land on the roof and use a positioning sensor, such as a gyroscope, to determine the UAV's orientation. The UAV roof analysis system may use the orientation of the UAV to determine the slope.

In some embodiments, a UAV may hover above the roof but below a peak of the roof. Sensors may determine a vertical distance to the roof below and a horizontal distance to the roof, such that the roof represents the hypotenuse of a right triangle with the UAV positioned at the 90-degree corner of the right triangle. A pitch of the roof may be determined based on the rise (vertical distance downward to the roof) divided by the run (horizontal forward distance to the roof).

In some embodiments, a UAV may hover above the roof at a first location and measure a vertical distance from the UAV to the roof (e.g., downward). In one such embodiment, a downward sensor may be used. The UAV may then move horizontally to a second location above the roof and measure the vertical distance from the UAV to the roof. Again, the roof becomes the hypotenuse of a right triangle, with one side of the triangle corresponding to the horizontal difference between the first location and the second location, and the second side of the triangle corresponding to the vertical difference between the distance from the UAV to the roof in the first location and the distance from the UAV to the roof in the second location.

In some embodiments, a UAV may hover above the roof at a first location and measure a horizontal distance from the UAV to the roof. In such embodiments, a forward, lateral, and/or reverse, sensor may be used. The UAV may then move vertically to a second location above the roof and measure the horizontal distance from the UAV to the roof. Again, the roof becomes the hypotenuse of a right triangle, with one side of the triangle corresponding to the vertical difference between the first location and the second location, and the second side of the triangle corresponding to the horizontal difference between the distance from the UAV to the roof in the first location and the distance from the UAV to the roof in the second location.

In some embodiments, the UAV roof analysis system may use three or more images and metadata associated with those images to calculate the pitch of the roof. For example, the UAV may capture a first image near the roof. The UAV may then increase its altitude and capture a second image above the first image. The UAV may then fly laterally towards the peak of the roof until the proximity of the UAV to the roof is the same as the proximity of the first image. The UAV may then capture a third image. Each image may have metadata associated with it including GPS coordinates, altitude, and proximity to the house. The UAV roof analysis system may calculate the distance of the roof traveled based on the GPS coordinates and altitude associated with the three images using the Pythagorean theorem. The UAV roof analysis system may then calculate the pitch by taking the ratio of the altitude and the distance of the roof traveled.

In some embodiments, to maintain stationary a UAV may have to tilt the body and/or one or more propellers to compensate for wind or other environmental factors. For various measurements and scans described herein, the images, measurements, and/or other captured data may be annotated to identify the tilt or angle caused by the UAV tilt. In other embodiments, the sensors, cameras, and other data capture tools may be mechanically or digitally adjusted, such as gyroscopically, for example. In some embodiments, measurements, such as distances when calculating skew and/or roof pitch, may be adjusted during calculations based on identified UAV tilt due to environmental factors. Similar measurements from various points relative to the roof may be used to identify sagging or bulging portions of the roof that fit within a patch size or are larger than a patch size.

The UAV may use the calculated pitch to adjust the angle of the camera to reduce image skew during a micro scan and/or loop scan. For example, once the pitch is calculated the UAV may perform a micro scan with the camera at a perpendicular angle to the roof and/or de-skew the image using software on the UAV, during post-imaging processing, and/or through cloud-based processing. In various embodiments, the calculated pitch is used to angle the camera so it is perpendicular (orthogonal) to the roof to eliminate skew during patch scan analyses.

In some embodiments, a pitch determination system may determine a pitch of the roof based on at least two distance measurements, as described above, that allow for a calculation of the pitch. An imaging system of the UAV may capture an image of the roof of the structure with the optical axis of the camera aligned perpendicular to a plane of the roof of the structure by adjusting a location of the UAV relative to a planar surface of the roof and/or a tilt angle of the camera of the UAV.

The UAV roof analysis system may also reduce and/or identify shadows in the images by calculating the current angle of the sun. The UAV roof analysis system may calculate the angle of the sun based on the time of the day, the day of the year, and GPS location. To eliminate the UAV's shadow from appearing in captured images, the UAV roof analysis system may apply the angle of the sun to the current UAV position in flight. The UAV position, the angle/position of the sun, and the relative location of surfaces and structures (e.g., roof) may determine precisely where the shadow of the UAV will appear. The UAV may adjust its position and camera based on the location of the roof shadow to ensure that each photograph will be captured in such a way as to completely eliminate the UAV's shadow.

In some embodiments, the UAV roof analysis system may also use the angle of the sun to determine the best time of day to photograph a site or portion of a site. For example, the shadow of an object on a site may obscure a structure during the morning. Based on the angle of the sun, the UAV roof analysis system may determine what time of day the shadow would no longer obscure the structure. The UAV may autonomously collect images during different times of day to ensure that shadow-free images of all, most, or specific portions of the structure are captured during boustrophedonic, loop, and/or micro scans. The systems and methods described herein are repeatable on a consistent basis for various properties and structures and are therefore aptly characterized as systematic.

In other embodiments, a shadow determination system (local or remote) may calculate (as opposed to directly observe) a location of a shadow cast by the proximate object onto the structure based on a current location of the sun, which can be accurately determined based on a current time and a GPS location of the structure. The imaging system may account for the shadow by (1) annotating images of the structure that include the calculated shadow, (2) adjusting an exposure of images of the structure that include the calculated shadow, and/or (3) identifying a subsequent time to return to the structure to capture non-shadowed images of the portions of the structure that are currently shadowed.

The UAV, server, and operator client may be connected via one or more networks. For example, the UAV may transmit images to the server via a cellular network. Additionally, the UAV may connect to the client via a second network such as a local wireless network. The UAV, server, and operator client may each be directly connected to each other, or one of the elements may act as a gateway and pass information received from a first element to a second element.

A standard flight plan may be saved on the server. The standard flight plan may be loaded on the UAV and altered based on information entered by the operator into the operator client interface. The UAV (e.g., via onboard or cloud-based processors) may also alter the standard flight plan based on the images captured and/or other sensor data.

In some embodiments, the system may generate all or part of a navigational risk zone. A navigational risk zone may include some or all of the area within which an autonomous vehicle, such as a UAV, may navigate to perform micro scans of the roof. For example, a rectangular office building may be associated with a navigational risk zone represented by an envelope surrounding a rooftop of the office building along with takeoff and landing approaches.

The navigational risk zone may include one or more navigational risk tag associated with specific locations relative to the roof. For example, if a tree is identified as having branches overhanging some portions of the rooftop, the portions below the overhanging branches may be tagged with a navigational risk tag indicating that an obstruction is overhead. A navigational risk tag may simply indicate the existence of the overhead obstruction. Alternatively, the navigational risk tag may provide additional detail, such as distance from the current location to the obstruction, the type of obstruction, or a flight pattern modification to avoid the obstruction.

A navigational risk tag may include a wide variety of warnings, notices, or other relevant information for the location. Examples of a navigational risk tag include, but are not limited to: identification of standing water, ice, or snow that may make sensor readings inaccurate; an obstruction that is more easily seen or detected from some vantage points than others (e.g., a net or wire); a feature or characteristic of the property that may be subsequently misidentified (e.g., a skylight might be mistaken as standing water on a roof and erroneously scanned); a feature or characteristic of the property that may necessitate addition or more careful scanning; high value items that should be avoided by a set distance (e.g., a car in a driveway); and/or other tags.

A UAV system may include onboard processing, onboard storage, communications systems, access to cloud-based processing, and/or access to cloud-based storage. The system may utilize one or more of these resources to analyze, image, and/or otherwise scan the roof. In some embodiments, the system may utilize computer vision in combination with a library of images for identifying properties, characteristics of properties, problems, defects, damage, unexpected issues, and the like.

The inclusion of computer vision intelligence may be adapted based on the use of computer vision in other fields and in its general form for use in UAV roof analysis. Computer visional analysis may include various systems and methods for acquiring, processing, analyzing, storing, and understanding captured images. The system may include digital and analog components, many of which may be interchangeable between analog and digital components. Computer vision tasks may be performed in the cloud or through onboard processing and storage. The computer vision system of the UAV may execute the extraction of high-dimensional data from captured images (optical, infrared, and/or ultraviolet) and other sensor data to produce numerical or symbolic information.

The computer vision systems may extract high-dimensional data to make decisions based on rule sets. As such, a rule-based analysis of roofs may be performed in a systematic, uniform, and repeatable manner. The computer vision systems may utilize images, video sequences, multi-dimensional data, time-stamped data, and/or other types of data captured by any of a wide variety of electromagnetic radiation sensors, ultrasonic sensors, moisture sensors, radioactive decay sensors, and/or the like.

Part of the analysis may include profile matching by comparing captured sensor data with data sets from a library of identifiable sensor profiles. An evaluator module or system may be responsible or partially responsible for this analysis. Such an analysis may be performed locally and/or in the cloud. For example, images of different types of shingles (e.g., asphalt, cedar, and clay) may be used to determine which type of shingle is on a roof being analyzed. Upon a determination that the shingles are asphalt, the system may compare captured images of the asphalt shingles on the roof with a library of defects in asphalt shingles to identify matching defects. The system may also use computer vision analysis techniques, artificial intelligence decision making techniques, optionally in combination with a library of data to modify alter the flight plan or path in real-time based on materials and/or damage that is detected.

For example, during a scanning process, one or more sensors may collect information that may be used to query a rule set. The rule set may modify a navigation pattern, flight direction, scan type, scan details, or other action taken or being taken by the UAV in response to a rule set's interpretation of the collected information.

As another example, a thermal scan of asphalt shingles may reveal a thermal profile data set that can be compared with a library of thermal profiles. A matched profile may be used to determine that the roof is undamaged, damaged, aging, poorly constructed, etc. In some embodiments, a first sensor system may be used and, if a matched profile is found, the system may follow a rule set to take a subsequent action that is different from the action that would have been taken if no matched profile had been found. An evaluator system or module (hardware, firmware, or software) may evaluate various inputs to make a decision and/or determine that human operator input is required.

In one example embodiment, an optical scan may be used to match profiles within the library that indicate that a portion of the roof may have a particular characteristic (e.g., damage, manufacturing material, construction material, construction methods, modification from prior specification, etc.). A rule set may dictate that, based on the matched profile within the library, another type of sensor system should be used for a subsequent scan and/or indicate that a scan with increased resolution or detail is warranted. In some embodiments, a three-dimensional representation of the roof may be visualized on an agent's computing device. The agent or homeowner may click on a location on the three-dimensional representation to view micro scans, such as a patch scan.

As above, numerous examples and descriptions are given with respect to roof surfaces and roof subsurfaces. Roofs are merely one example of a surface or subsurface that can be analyzed and/or scanned using the systems and methods described herein. Many, if not all, of the embodiments and combinations of embodiments of the systems and methods described herein may be applied to various exterior and interior surfaces of a structure or other property.

The term "surface or subsurface" as used herein is used in an inclusive sense such that scanning or analyzing "a surface or subsurface" may include scanning or scanning or analyzing the surface, the subsurface, or both the surface and the subsurface. A surface may include any exposed surface of a structure or other property. A subsurface may include anything beneath, behind, hidden, or obscured by the surface to one or more sensor types.

For instance, an optical imaging sensor may be used to scan a surface of a roof. An infrared imaging sensor may be used to scan a surface of a roof as well, but may also be used to image thermal variations in the subsurface of the structure, such as embedded moisture, underlying structural members, and the like.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special-purpose processing device, such as an ASIC, a PAL, a PLA, a PLD, a CPLD, a Field Programmable Gate Array (FPGA), or other customized or programmable device. The computer may also include a computer-readable storage device, such as non-volatile memory, static RAM, dynamic RAM, ROM, CD-ROM, disk, tape, magnetic memory, optical memory, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

Some of the embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Further, those of skill in the art will recognize that one or more of the specific details may be omitted, or other methods, components, or materials may be used. In some cases, operations are not shown or described in detail. Thus, the following detailed description of the embodiments of the systems and methods of the disclosure is not intended to limit the scope of the disclosure, as claimed, but is merely representative of possible embodiments.

FIG. 1A illustrates an example of a user interface for initiating a standard or default UAV roof analysis from an electronic computing device, according to one embodiment. As illustrated, a user interface may allow an operator (e.g., an owner or agent, representative, contractor, or employee of company) to push a button to begin analysis. In various embodiments, the system may collect data from the entire roof and/or a predefined sample size from one or more sections of the roof. In various embodiments, the entire roof may be scanned and analyzed. To conform with various industry standards, the entire roof may be scanned using one or more patch scan regions with defined dimensions.

Figure 1B:
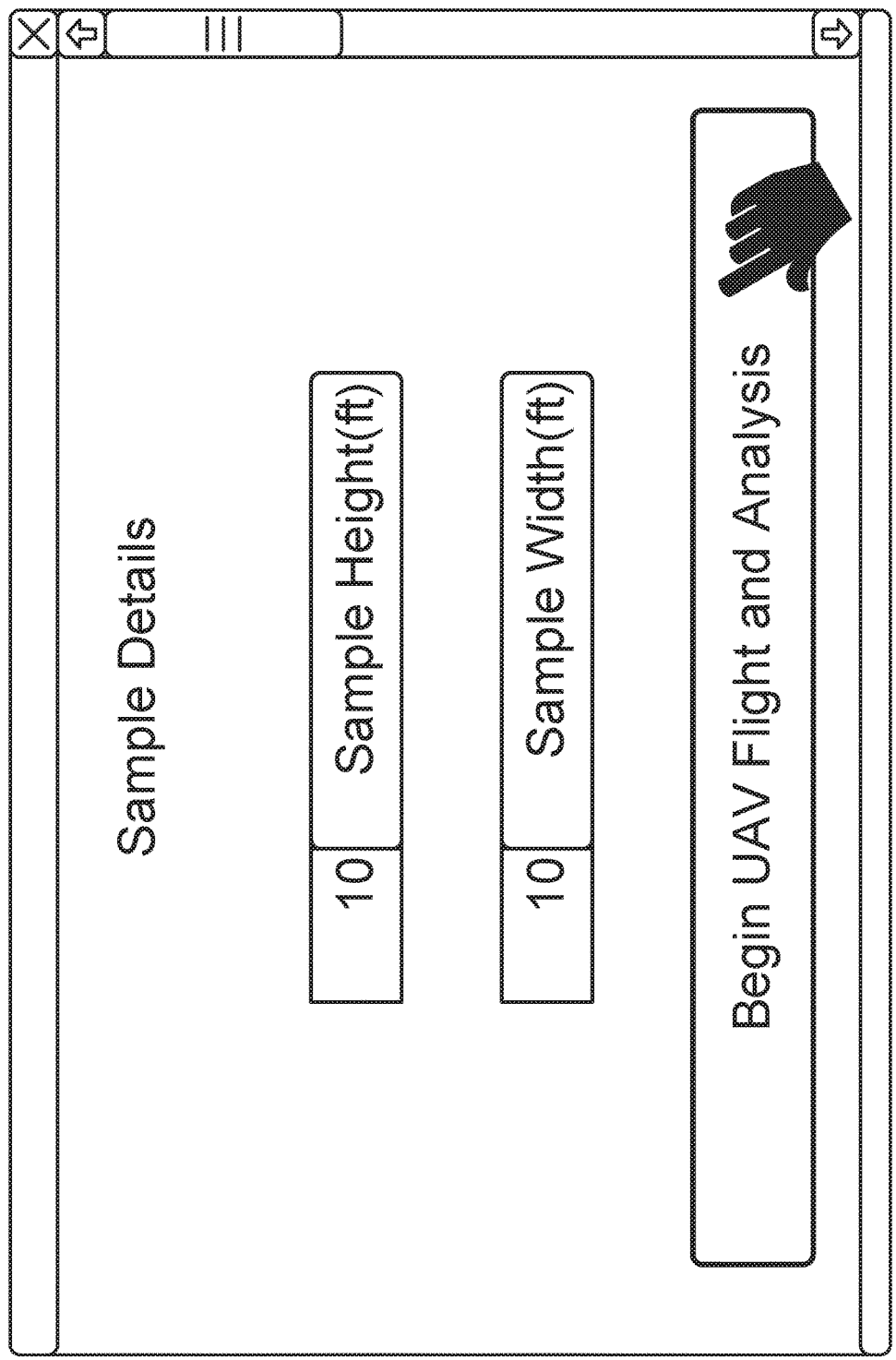
FIG. 1B illustrates an example of a user interface for initiating a customized UAV roof analysis from an electronic computing device, according to one embodiment.

FIG. 1B illustrates an example of a user interface for initiating a UAV roof analysis from an electronic computing device, according to one embodiment. As illustrated, a user interface may allow an operator (e.g., an owner or agent, representative, contractor, or employee of company) to select a sample size for patch scans and begin a UAV flight and analysis. In various embodiments, the sample size selection may correspond to a patch scan region with defined dimensions that are accepted by an industry standard. While the illustrated embodiment allows for a rectangular selection based on width and height, a wide variety of alternatives are possible. For instance, in one embodiment the selection may simply be a number "patches" per face of the roof, where each patch conforms to a standard size. In another embodiment, no selection may be available at all as the UAV may simply perform a standardized patch scan. Alternatively, each face of the roof may be considered its own patch region with unique dimensions.

As an example, the International Association of Certified Home Inspectors requires that a 10'×10' square section be used when possible with corners marked in chalk and damage points circled within the 100-square-foot region. Accordingly, to conform with the standard, in one embodiment the UAV system may digitally mark (e.g., overlay markings) on a 10'×10' section of the roof and digitally annotate (e.g., overlay markings on) each damage point therein.

Figure 2:
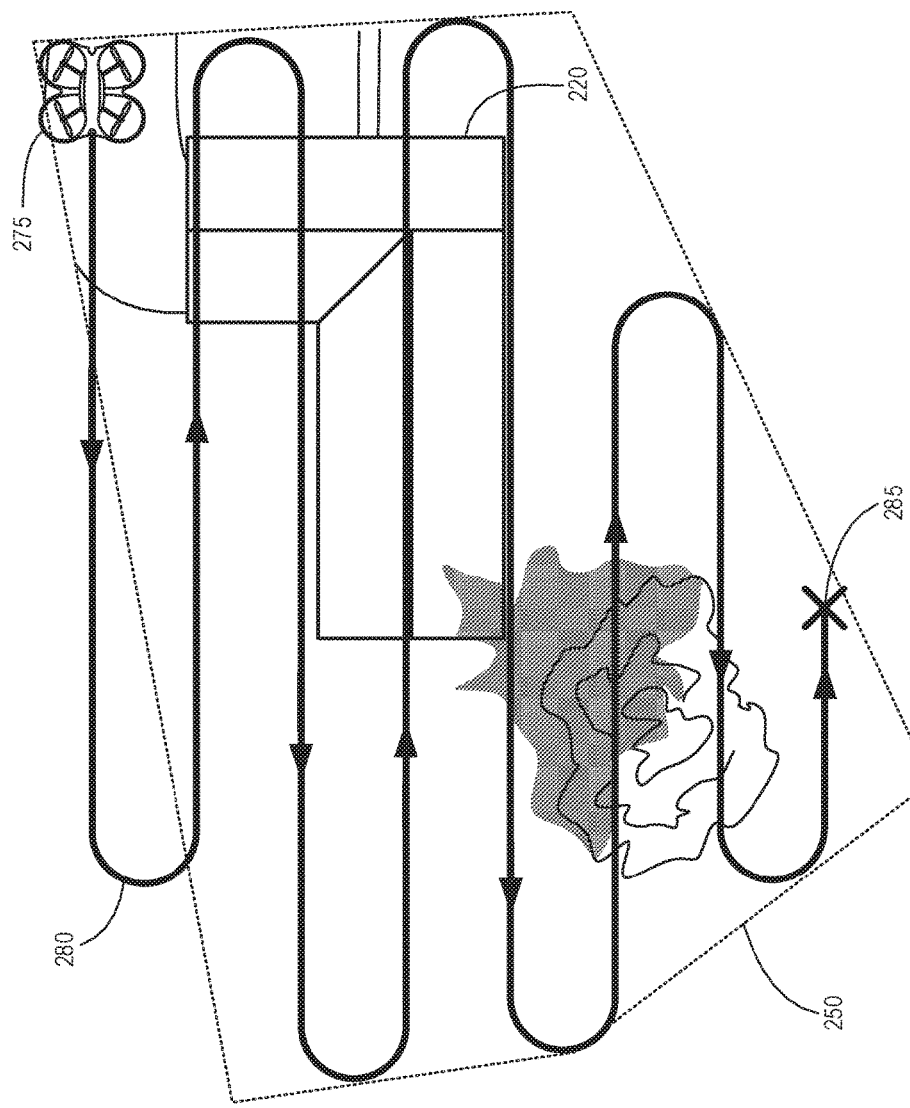
FIG. 2 illustrates boustrophedonic flight path of UAV for an initial assessment of a property, according to one embodiment.

FIG. 2 illustrates a boustrophedonic scan of a rooftop defined by the identified geographic boundaries 250 that include a structure 220. During the boustrophedonic scan, the UAV 275 may capture images while following a boustrophedonic flight pattern 280. For clarity, the number of passes shown is eight; however, the actual number of passes may vary based the size of the roof being analyzed. Similarly, the flight path may not extend to the boundaries of the property but instead only extend just beyond or just short of the boundaries of the roof of the structure 220. The number of passes may depend on a desired resolution, camera field of view, camera resolution, height of the UAV 275 relative to the roof, and/or other characteristics of the desired scan, capabilities of the UAV 275, and attributes of the surface.

The UAV 275 may fly to a start location. The start location may be at a first corner of the property 250 or the roof of the structure 220. The UAV 275 may then follow a straight path until a boundary line or edge of the roof is reached. The UAV 275 may then turn and follow an offset path in the opposite direction. The UAV 275 may continue to travel back and forth until an end point 285 is reached and the entire roof has been traveled. The UAV 275 may travel at a high altitude such that it will not collide with any obstacle or structure and/or avoid obstacles in the path by going around or above them. During the flight, the UAV 275 may capture images. In some embodiments, onboard processing or cloud-based processing may be used to identify structures and obstacles. Alternatively, analysis may be conducted after scanning is complete and the UAV has returned home.

Figure 3:
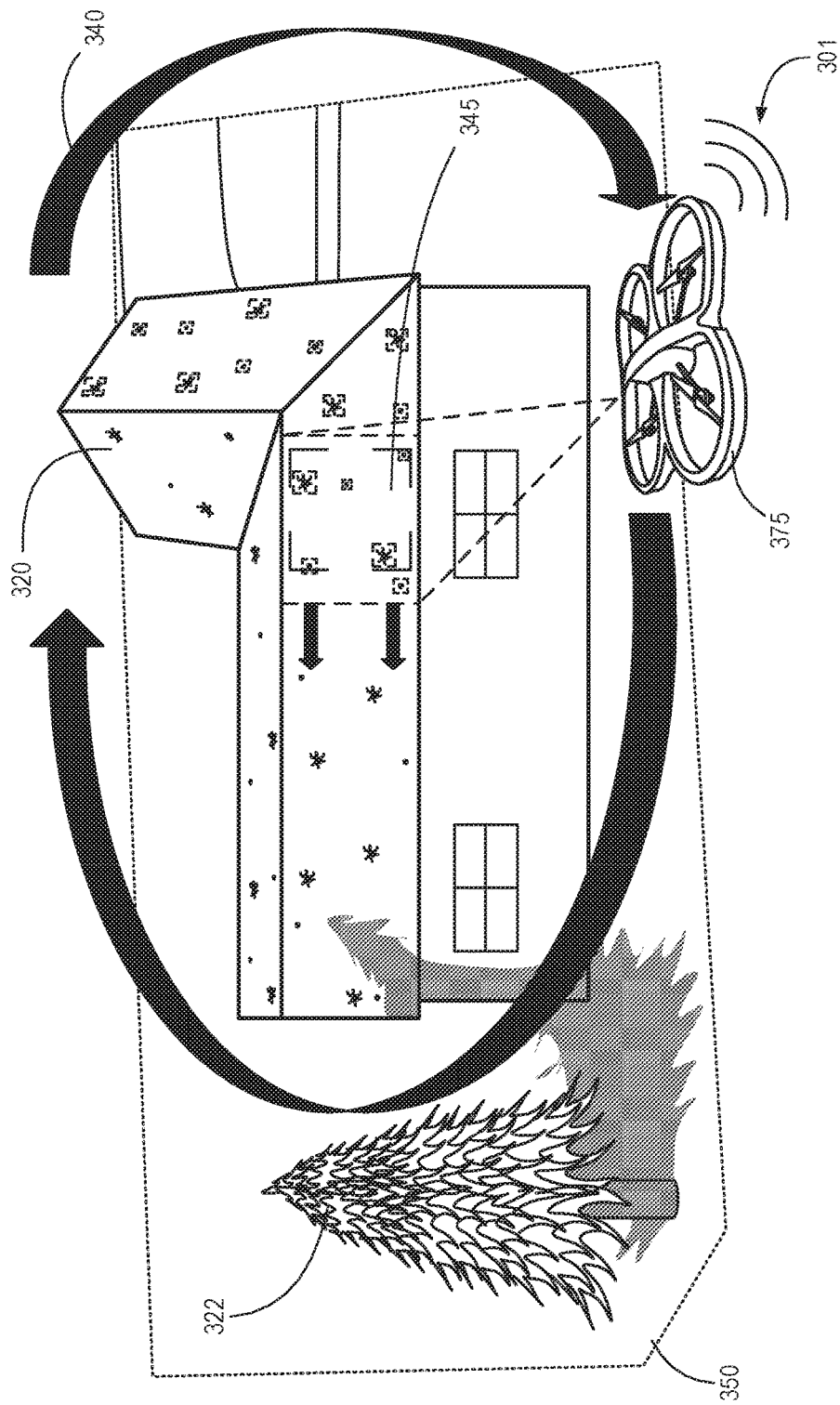
FIG. 3 illustrates an example of a UAV flight path during which one or more patch scan analyses are performed, according to one embodiment.

FIG. 3 illustrates a loop scan 301 of a roof 320 on a site 350. The loop scan 301 may be used to take a series of angled images of the roof to develop one or more patch scans 345. Each patch scan may be annotated to show boundaries of a predefined size and/or include a number of annotated damage locations. As the UAV 375 continues to travel, it may identify additional, only the worst, or only the best possible patch scan regions to illustrate the condition of the roof.

A UAV 375 may perform the loop scan 301 by following a flight pattern 340 that causes the UAV 375 to travel around the perimeter of the roof 320 at a second altitude range lower than the altitude of the boustrophedonic scan shown in FIG. 2. By following a flight path at a lower elevation, the UAV 375 may capture images with a higher resolution and/or images at a different angle. The images (visible spectrum or otherwise) can be used to produce patch scans with bounded and predefined characteristics.

Figure 4:
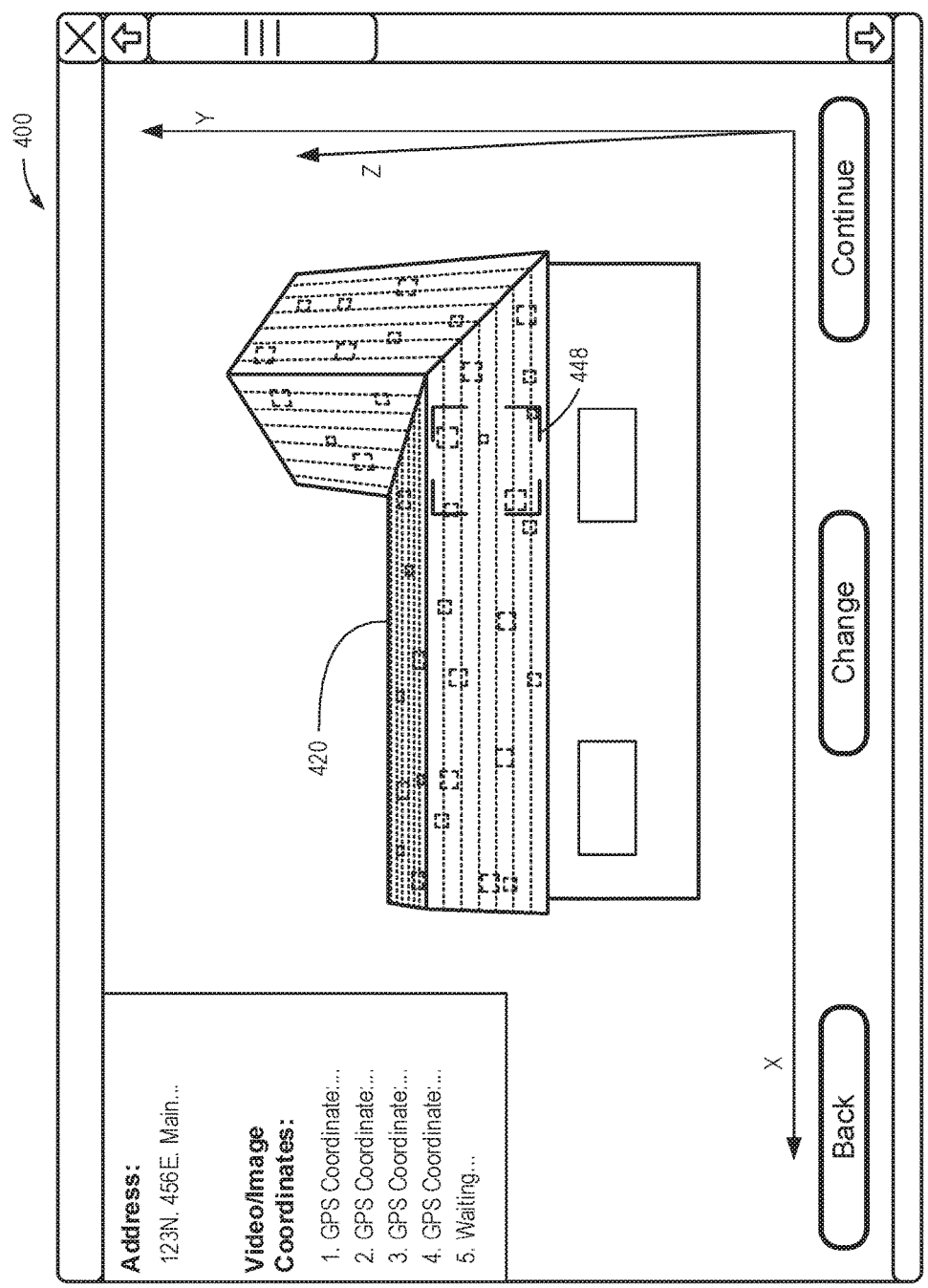
FIG. 4 illustrates a three-dimensional model of a roof displayed on an electronic computing device produced using imaging data collected by a UAV, including one or more patch scan analyses, according to various embodiments.

FIG. 4 illustrates a three-dimension model 420 that may be developed using data gathered during one or more scans, such as the loop scan in FIG. 3. The three dimensional model 420 may be displayed 400 on an operator's electronic computing device for display to an owner or other interested individual. The three dimensional model 420 may be used to explain the extent of damage and or as evidence of the accuracy of the assessment. For example, patch scans 448 of a predetermined size, shape, location, etc. that conform to one or more industry specifications may be displayed on the roof of the three dimensional model 420. Damage marks and/or patch scan boundaries may be shown by annotating actual images. Alternatively, a digitally rendered model of the entire structure and/or roof may be developed that includes the damage marks and/or patch scan boundaries. In various embodiments, tapping, mousing-over, or otherwise selecting a portion of the roof may display the damage marks more clearly, such as with highlighting or color coded effects based on severity or overall damage status of a patch scan region. Similarly, patch scan boundaries may be selectively displayed as overlays with color coding to show damage severity.

In some embodiments, the UAV itself does the image processing to generate the patch scan regions with identified damage points, associated boundaries, and overlay markings. In other embodiments, the UAV may upload the scan data to a cloud-based analysis system and/or to the operator's electronic computing device for processing. Thus, in some embodiments, the displayed three dimensional model 420 may include actual images of the rooftop and, when a region is selected, a patch scan region with a predefined size and/or shape is overlaid on the image and damage marks within the overlaid scan patch are identified. In some embodiments, they system may perform an objective analysis of each damage mark to determine the extent of the damage. Color coded annotations may be used to visually illustrate the extent of the damage.

As a specific example, a patch scan region that shows little or no damage may be outlined in green. A patch scan region with medium damage may be outlined in yellow, while a heavily damaged region may be outlined in red. Similar codings may be used for each individual damage points. Damage assessments may conform to industry practices and standards for a given applicable administrative body.

Figure 5:
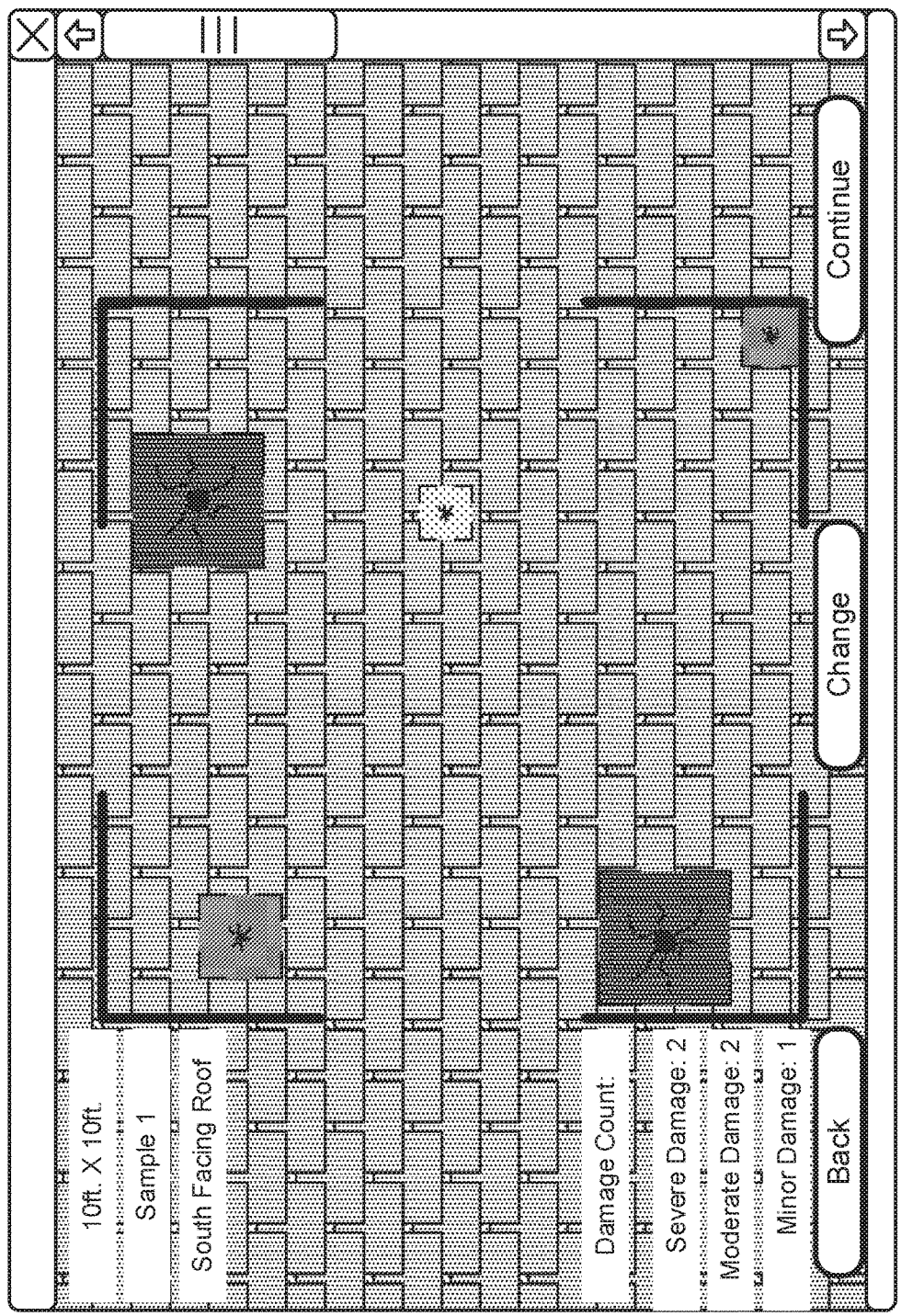
FIG. 5 illustrates a close-up view of a patch scan analysis on an electronic computing device, according to one embodiment.

FIG. 5 illustrates a close-up view of a patch scan analysis on an electronic computing device, according to one embodiment. An operator may select a patch scan region in the three dimensional visualization shown in FIG. 4. In response to the selection, the damage visualization software may present a zoomed in view of the patch scan region outlined with black lines in the corners. Each damage mark may be marked and annotated based on objective severity. Color coding may be used. Information regarding the sample size, location, and severity may be textually communicated as well.

Figure 6:
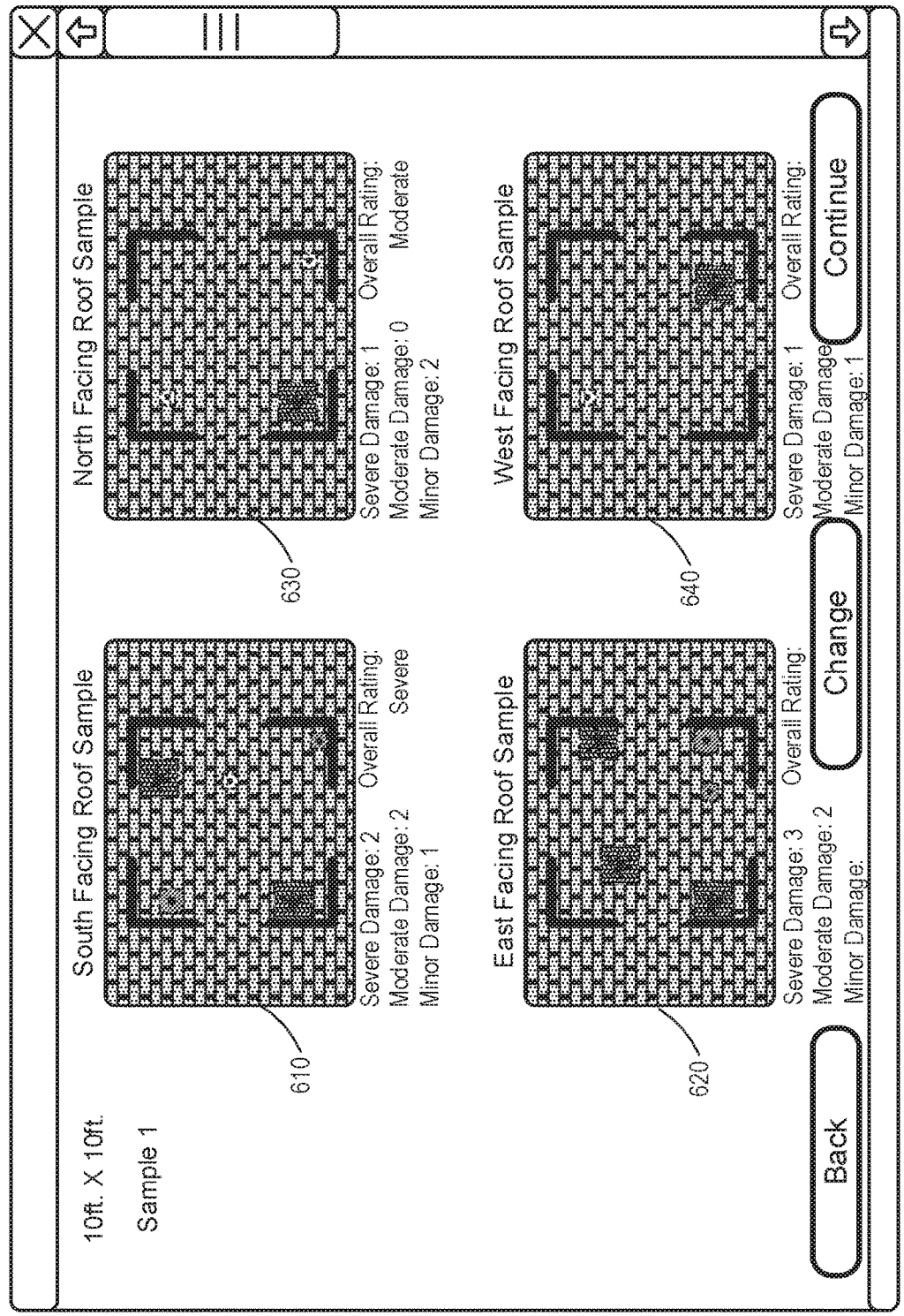
FIG. 6 illustrates close-up views of patch scan analyses for each face of a roof on an electronic computing device, according to one embodiment.

FIG. 6 illustrates close-up views of patch scan analyses 610, 620, 630, and 640 for each face of a roof on an electronic computing device, according to one embodiment. As per the illustrated example, each patch scan region 610-640 may be outlined with black lines in the corners and damage marks highlighted and/or color coded based on severity. Textual information for each patch scan region 610-640 may describe the number of severe damage locations, the number of moderate damage locations, and the number of minor damage locations. The damage visualization software may also compute and/or display an overall damage severity.

Figure 7:
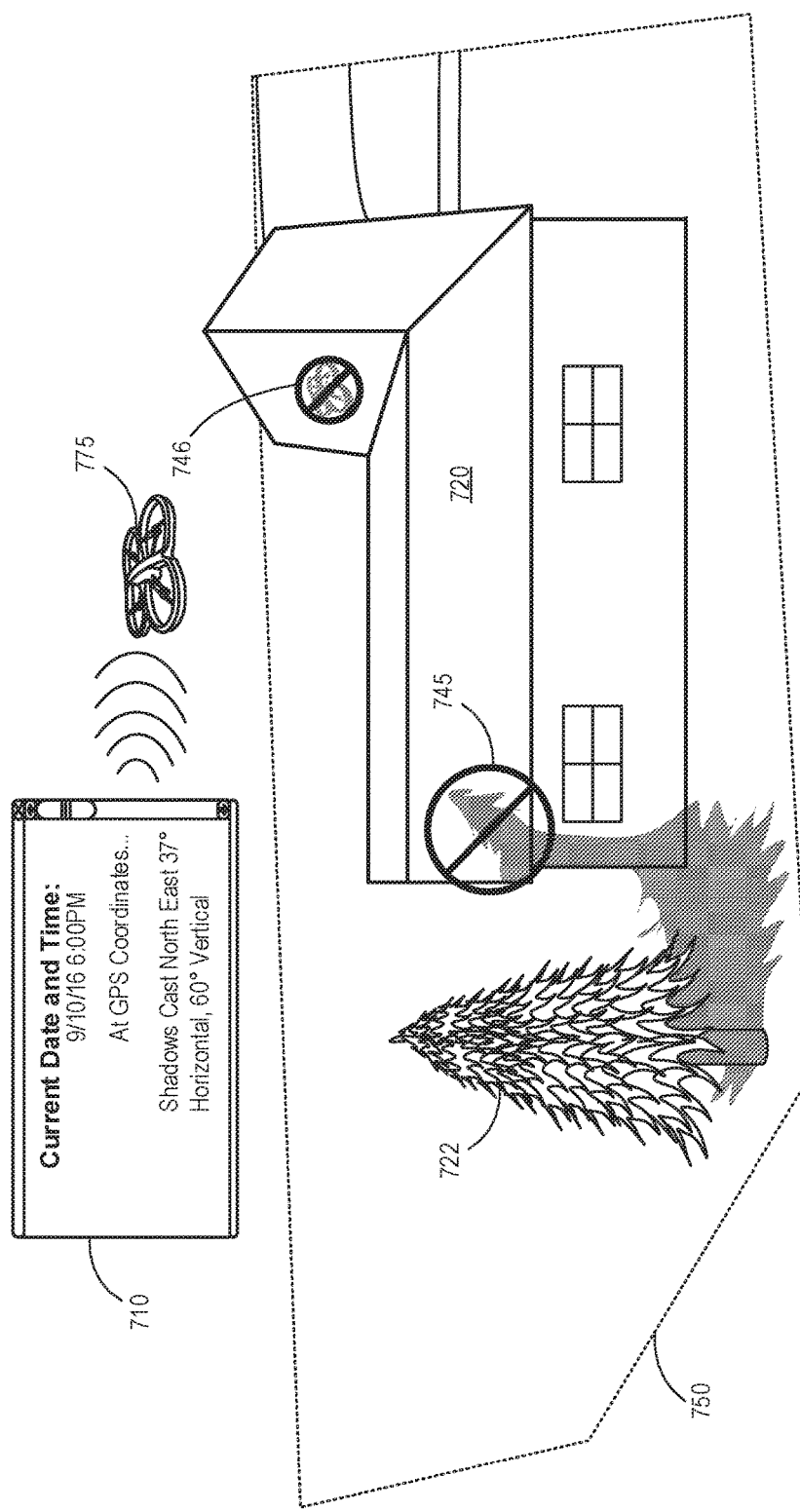
FIG. 7 illustrates a UAV using the date and time to identify and/or eliminate shadows in image captures, according to one embodiment.

FIG. 7 illustrates a UAV roof analysis system using the date and time 710 to identify and/or optionally eliminate shadows in image captures. As shown a UAV 775 may receive the current date and time 710. The UAV 775 may determine a shadow 745 of obstacles 722 on a site 750. The UAV 775 may refrain from taking images of the portion of a roof 920 covered by the shadow 745 of the obstacle 722, annotate or otherwise identify shadow 745, and/or take additional images at a subsequent time when the shadow 745 has moved. Further, the UAV 775 may determine a time when the shadow 745 will move away from the roof 720. The UAV roof analysis system using the date may also adjust the camera angle on the UAV 775 to avoid shadows 746 from the UAV 775.

Figure 8:
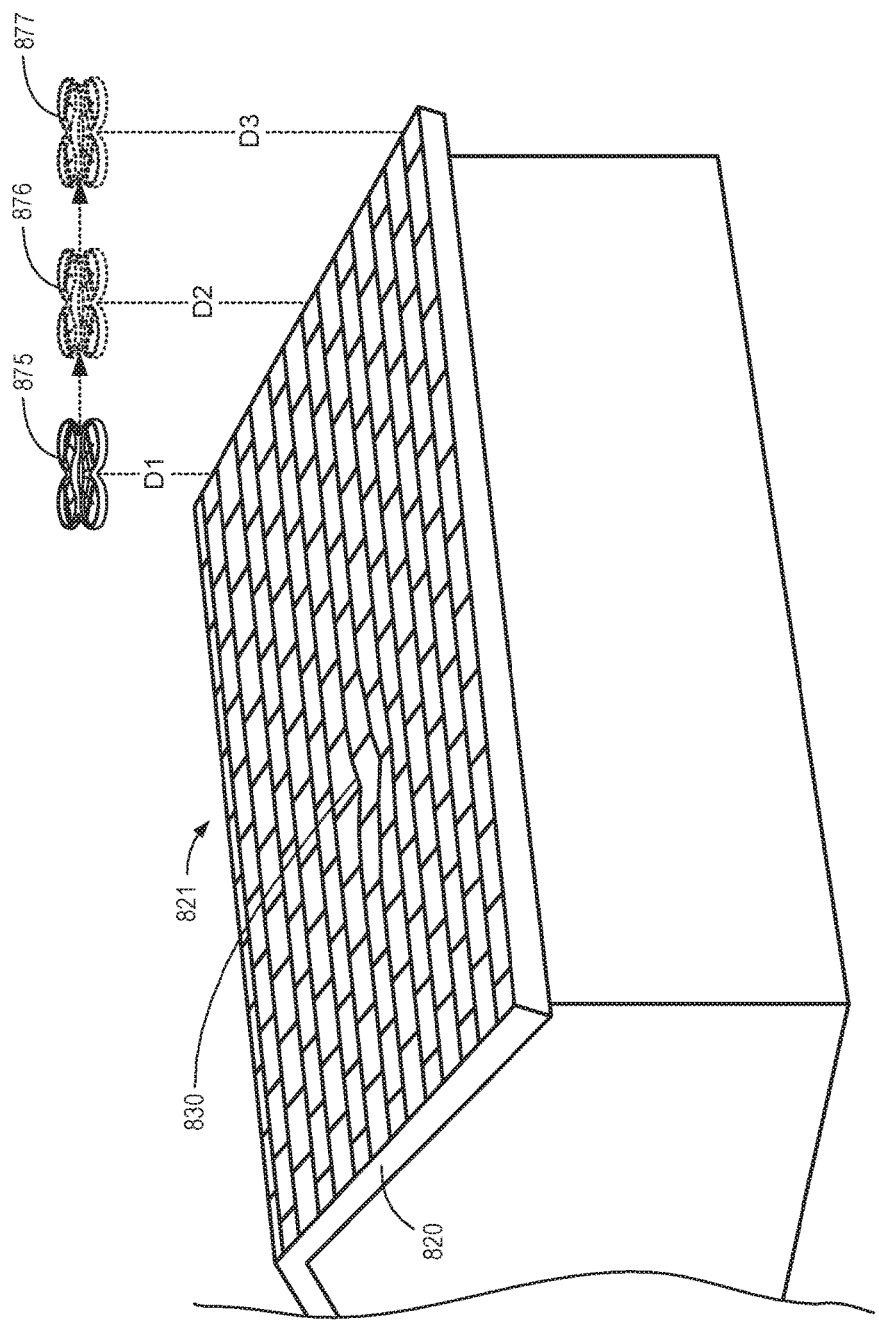
FIG. 8 illustrates a UAV determining a pitch of a roof, according to one embodiment.

FIG. 8 illustrates a UAV determining a pitch 821 of a roof 820 of a structure. The UAV 875 may capture three or more images of the roof: a first image at a first horizontal displacement location 875, a second image at a second horizontal displacement location 876, and a third image at a third horizontal displacement location 877. The UAV may use these images along with associated metadata, including proximity data, to determine the pitch 821 of the roof.

The UAV may also detect inconsistencies 830, such as a depression or bulge, in the shingles on the roof. The inconsistencies 830 may be a sign of damage to the roof. The UAV may mark the inconsistency 830 as a portion of interest for a subsequent patch scan analysis.

In various embodiments, the UAV 875 includes a propulsion system to move the UAV 875 from a first aerial location to a second aerial location relative to a structure. Movements may be horizontal, vertical, and/or a combination thereof. Lateral movements and rotation may also be possible. As previously described, the UAV may include one or more sensors that can be used, or possibly are specifically configured to determine distances to objects, such as the roof 820. The UAV may determine a distance to a roof at a first aerial location. The UAV may then move to a second aerial location along a movement vector that includes one or more directional components (e.g., up, down, left, right, back, or forward, which could be more generally described as vertical, horizontal, or lateral, or even described using an X, Y, and Z coordinate system). A distance to the roof may be calculated at the second aerial location. A pitch of the roof may be calculated (e.g., geometrically) based on the distance measurements at the first and second locations and at least one of the components of the movement vector.

Figure 9:
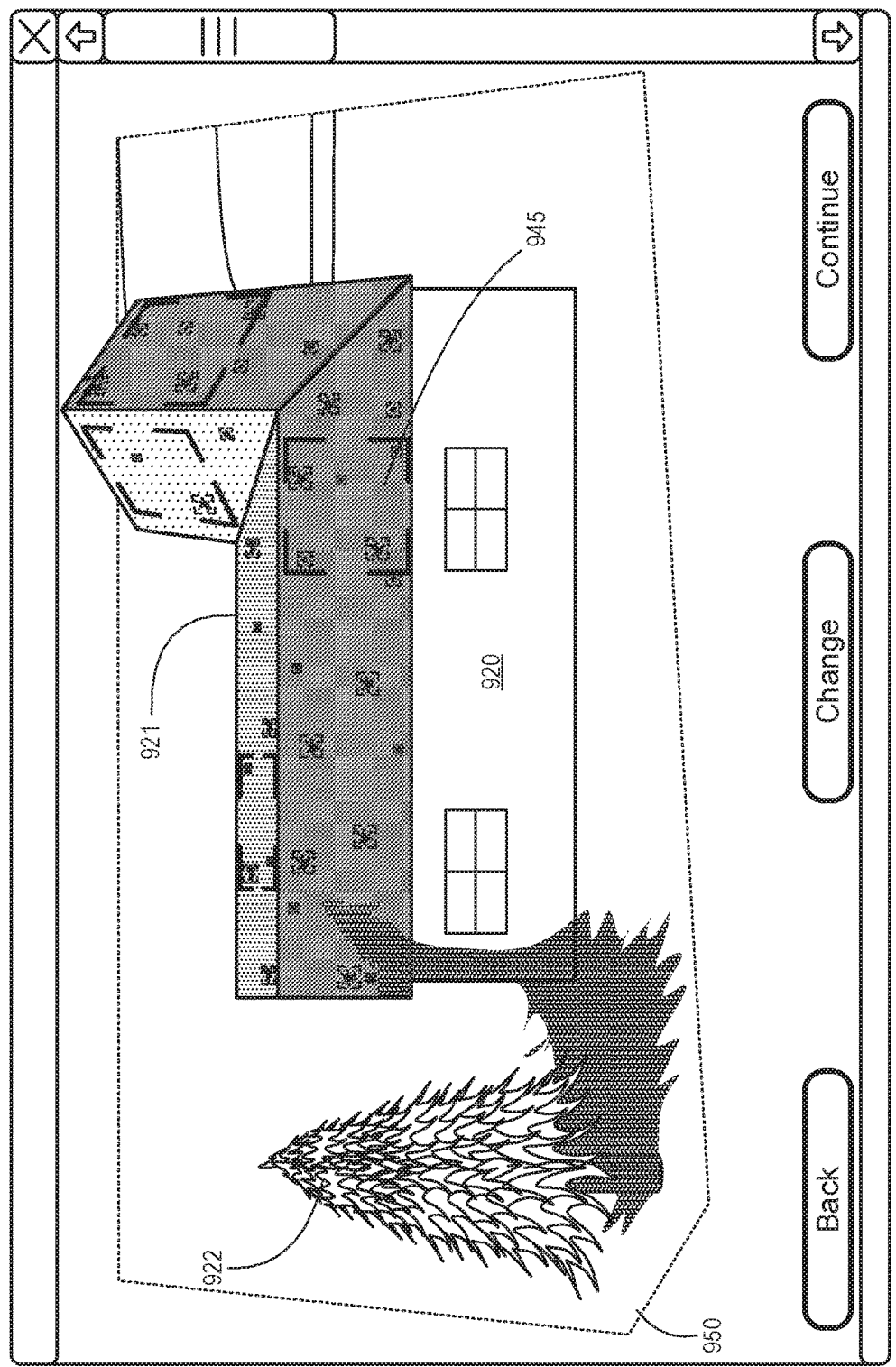
FIG. 9 illustrates a three-dimensional rendering of a house with annotated damage markers and patch scan region outlines, according to various embodiments.

FIG. 9 illustrates a three-dimensional rendering of a house 920 displayed on an operator's computing device with annotated damage markers and patch analysis locations 945 on the roof 921 thereof. The displayed rending may include other objects, such as a tree 922 and boundary markers 950 to provide contextual information for understanding the images and damage illustrated.

Figure 10:
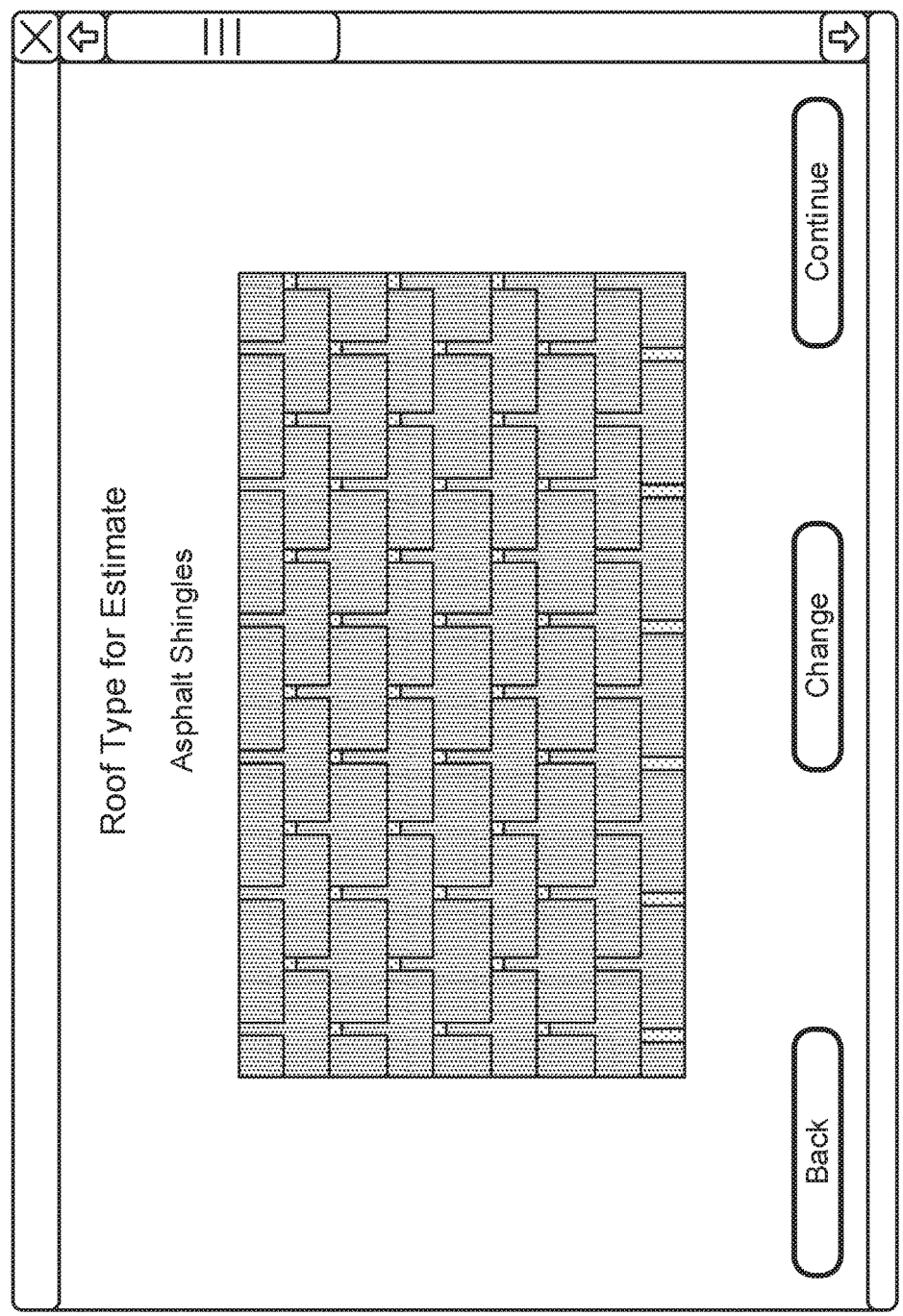
FIG. 10 illustrates a roof-type analysis result displayed on an electronic computing device, according to one embodiment.

FIG. 10 illustrates a roof-type analysis result displaying a detected shingle type as being "asphalt shingles" along with an image. An agent or homeowner can verify the accuracy in some embodiments.

FIG. 11 illustrates an estimate of repairs based on patch analyses and a roof-type analysis presented on an electronic computing device, according to various embodiments. In the illustrated embodiment, the roof is identified as being constructed as asphalt shingles. The total square footage is measured by the UAV as being 1700 square feet. Thirty-three damage points are identified on four roof faces. Three of the four roof faces are noted as requiring replacement. In total, 1275 square feet are recommended for replacement and 300 square feet are recommended for repair. The average damage is considered moderate and a cost per square foot for replacement is estimated at $7.00 per square foot for a total cost of just under $9,000.

According to various embodiments, a remediation determination system may evaluate the severity of damage and the number of damage points on each face of a roof and assign a remediation status thereto. For example, faces of the roof may be assigned a "replace" status, a "repair" status, or "no remediation is needed" status. The roof faces may be assigned a remediation status based on a patch region analysis with a patch have a defined dimension, or based on a total number of damage points and severity rankings on each face.

FIG. 12 illustrates an UAV roof analysis system for analyzing a structure, according to one embodiment. As illustrated, a user interface 1210 may include a roof selection interface 1215 to receive an electronic input from an operator or other technician that identifies a roof t to be analyzed. The user interface 1210 may further include an analysis and/or patch specification interface 1220 to receive user input identifying a desired roof analysis and/or to allow a user to specify the type of patch scans to conduct. For example, patch scan may be specified with specific dimensions, shapes, sizes, etc. to conform to the requirements or standards set by a governing entity or applicable standard.

The user interface 1210 may additionally or optionally include a hazard identification interface 1225 allowing a user to identify one or more hazards proximate a structure or site identified using the roof selection interface 1215. A damage and estimate visualization interface 1227 allows an operator to visualize and/or present to an interested party a visual representation of a damage assessment. Estimates for repair and/or replacement (i.e. remediation) may also be prepared and presented via the damage and estimate visualization interface 1227.

A control system 1230 may be onboard a UAV 1255, may be remote (e.g., cloud-based), and/or integrated into the computing device running the user interface 1210. The control system 1230 may provide instructions to the UAV 1255 to cause it to conduct an assessment and roof analysis. The control system 1230 may include a camera control module 1235, other sensor control modules 1240, image and/or sensor processing modules 1245, and/or scanning modules 1250 to implement boustrophedonic, loop, and/or patch scans. The UAV 1255 itself may include one or more cameras 1260 that may be used simultaneously or successively and/or may require manual swapping, one or more optical sensors 1265, ultrasonic sensors 1270, other sensors 1275, and one or more network communication systems 1280. FIG. 12 is merely representative of one example embodiment, and numerous variations and combinations are possible to implement the systems and methods described herein.

Figure 13:
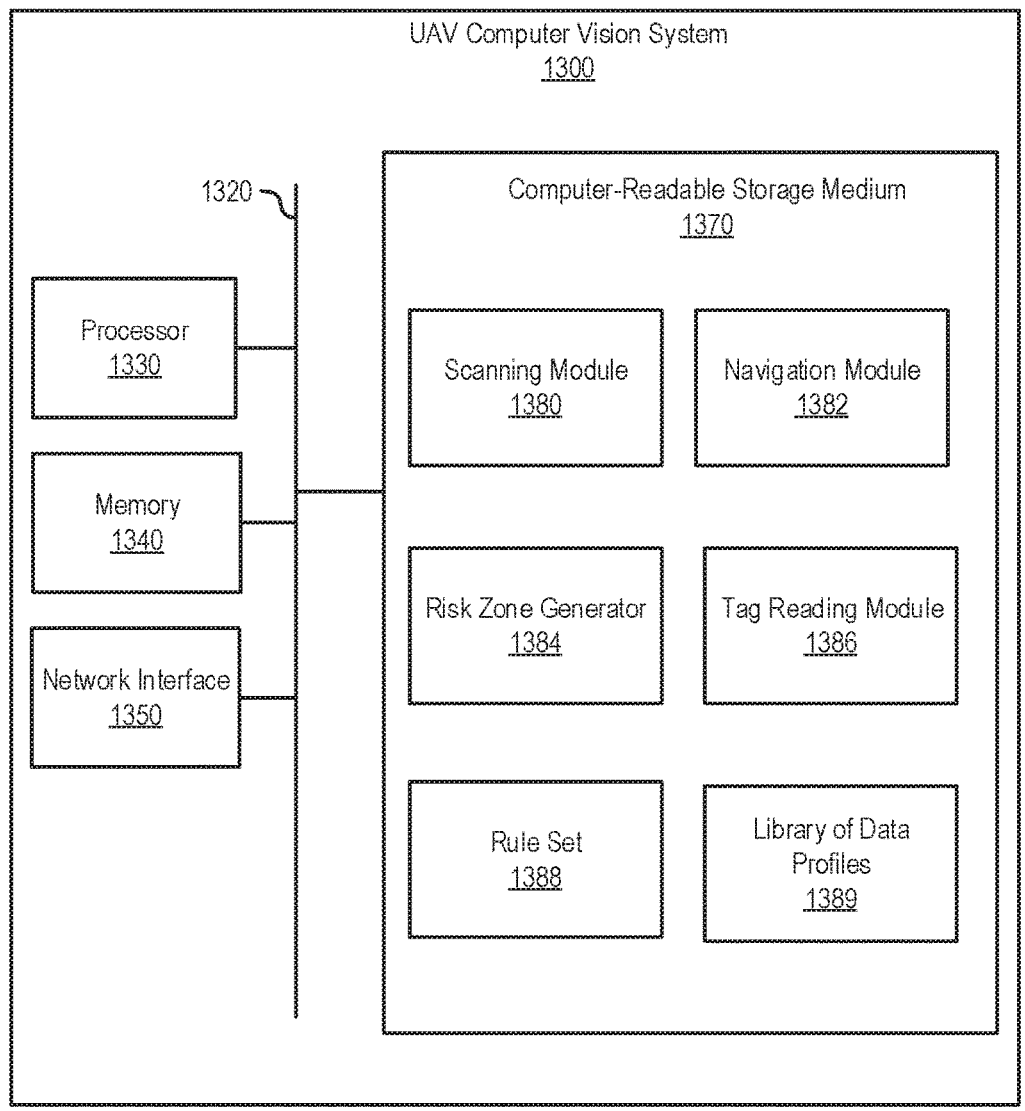
FIG. 13 illustrates a system for roof analysis including a library of data profiles for computer vision matching, according to one embodiment.

FIG. 13 illustrates a system for roof analysis including a library of data profiles 1389 for computer vision matching, according to one embodiment. The UAV computer vision system 1300 may be onboard the aerial vehicle, cloud-based, or a combination thereof. The system 1300 may include a processor 1330, memory 1340 and a network interface 1350 connected to a computer-readable storage medium 1370 via a bus 1320.

A scanning module 1380 may incorporate or control any of the systems described herein and implement any of the methods described herein. A navigation module 1382 may utilize navigation sensors of the UAV and include various control mechanisms for navigating the UAV to perform scans, including boustrophedonic, loop, and/or micro scans with patch scan region analysis.

The risk zone generator 1384 may generate a risk zone associated with the property (e.g., overhead power lines, vehicle, structure, tower, bridge, road, residence, commercial building, etc.) within which the UAV may navigate while performing one or more types of scanning operations. The risk zone generator 1384 may tag portions of the risk zone with scan-relevant tags and obstacle tags to aid the scanning of the property and/or avoid obstacles during navigation.

During micro scans and patch scan analyses, a tag reading module 1386 may receive information from tags based on the location of the UAV within the risk zone and relative to the property. The tag reading module 1386 may receive scan-relevant or navigation-relevant information. The information therein may be used to query a rule set 1388. The rule set 1388 may modify a navigation pattern, flight direction, scan type, scan details, or other action taken or being taken by the UAV in response to a rule set's interpretation of information provided by a tag read by the tag reading module 1386.

The UAV computer vision system 1300 may also access a library of data profiles 1389. Scan data captured by the UAV of any type of sensor may be compared and matched with data profiles within the library of data profiles 1389. In response to the UAV computer vision system 1300 identifying a match within the library of data profiles 1389, the rule set 1388 may dictate a modification to the scanning or navigation pattern.

Figure 14:
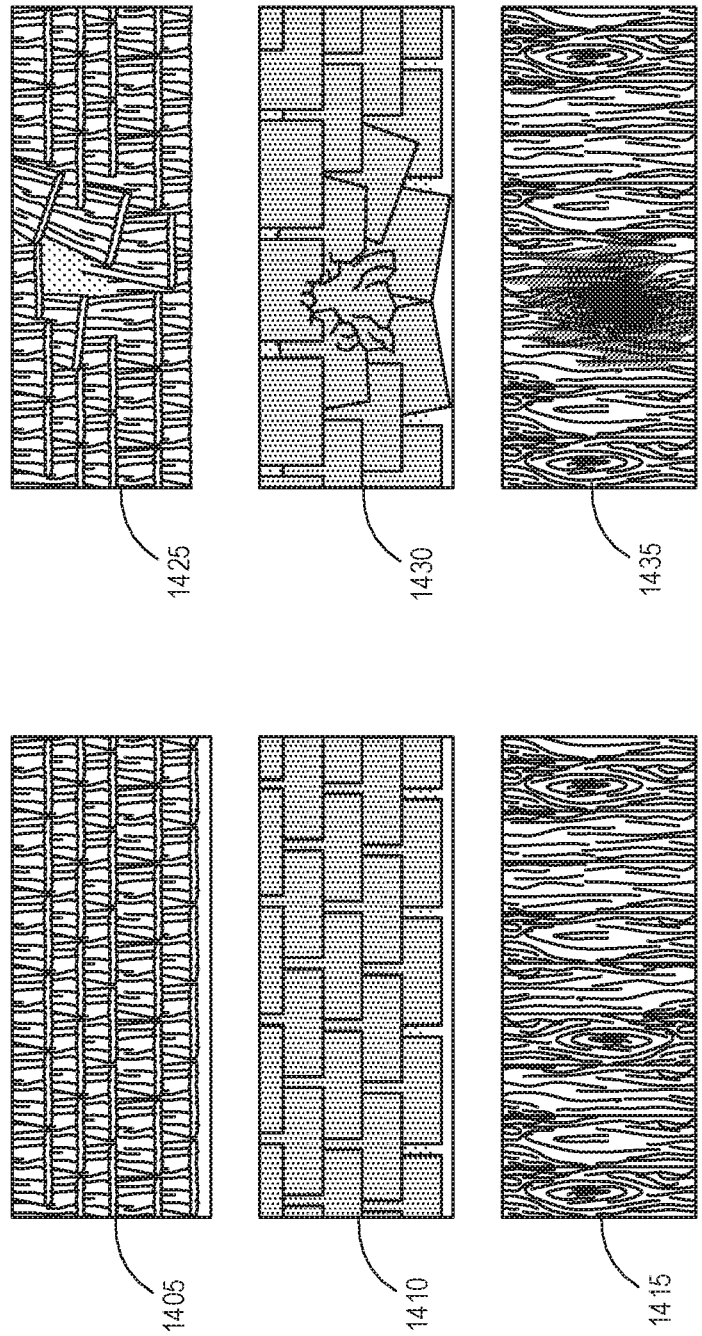
FIG. 14 illustrates examples of possible library images of data profiles, according to one embodiment.

FIG. 14 illustrates examples of possible library images of data profiles 1405-1435, according to one embodiment. Many examples of data profiles may not be optical and are not illustrated within the drawings. For example, infrared data profiles and ultrasound profiles may be used instead of or in addition to optical data profiles. For example, a false color representation of an infrared scan may be used to show water damage to a roof. The UAV system may capture sensor data and identify a material by comparing the captured images with data profiles within a library of data profiles. For example, computer vision may be used to identify a roof as cedar shakes 1405, asphalt shingles 1410, or wood 1415.

Once a material is identified and scanning continues, subsequent images can be compared with other data profiles to identify defects or other characteristics. For example, windblown cedar shakes 1425 may be identified through computer vision techniques. Hail pops in asphalt shingles 1430 may be identified by matching captured image data with stored data profiles. Similarly, defects in wood 1435 may be identified by matching captured sensor data with library data profiles.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims:

What is claimed is:

1. An unmanned autonomous vehicle (UAV) assessment system for visually presenting an analysis of a roof of a structure, comprising:
   a receiver to receive data collected by at least one sensor on an unmanned autonomous vehicle, the data including scan data of at least a portion of a roof of a structure;
   an analyzer to identify a plurality of defects within a sample region of the roof of the structure based on the received scan data, wherein the sample region corresponds to a sub-portion of the roof and has a defined size characteristic;
   a visualization system to generate a visual presentation of:
      at least a portion of the roof,
      a visible sample region overlay marking visually identifying the sample region in spatial context of the displayed portion of the roof, and
      a plurality of visible defect overlay markings in context of the defined size characteristic of the sample region to visually identify at least some of the plurality of defects identified within the sample region.

2. The system of claim 1, further comprising a sample region selection module configured to receive user input defining the size characteristic of the sample region based on at least one of an input size, perimeter, area, shape, and location within which the plurality of defects is to be identified by the analyzer.

3. The system of claim 1, wherein the analyzer is configured to identify the plurality of defects within the sample region by receiving data from a cloud-based identification system.

4. The system of claim 1, wherein the sample region is defined as a one of a rectangle and a square encompassing a defined square footage.

5. The system of claim 1, wherein the scan data of at least a portion of a roof comprises at least one of a surface of a roof and a subsurface of a roof.

6. The system of claim 1, further comprising an estimation module to prepare an estimate for repairing or replacing at least a portion of the roof associated with the sample region.

7. An unmanned autonomous vehicle (UAV) assessment system for surface or subsurface analysis, comprising:
   a user input device to receive an input from an operator to initiate the surface or subsurface analysis;
   a communication receiver to receive data collected by at least one sensor on an unmanned autonomous vehicle, the data including scan data of a portion of a surface or subsurface;
   an analyzer to identify one or more defects within a sample region of the surface or subsurface from the scan data, wherein the sample region has a defined size characteristic comprising at least one of: a defined area, a defined diameter, a defined height, and a defined length;
   a visualization system to generate a visual presentation of:
      at least a portion of the surface or subsurface;
      a visible sample region overlay marking visually identifying the sample region in positional context of the displayed portion of the surface or subsurface, and
      at least one visible defect overlay marking in context of the defined size characteristic of the sample region, wherein the displayed defect overlay marking is distinct from the sample region overlay marking for the one or more defects identified within the sample region.

8. The UAV assessment system of claim 7, further comprising a sample region selection module configured to receive input from the operator defining the size characteristic of the sample region based on at least one of an input size, perimeter, area, shape, and location within which the at least one defect is to be identified by the analyzer.

9. The UAV assessment system of claim 7, wherein the analyzer is configured to identify the one or more defects within the sample region by receiving data from a cloud-based identification system.

10. The UAV assessment system of claim 7, wherein the sample region is defined as a rectangle encompassing approximately 100 square-feet.

11. The UAV assessment system of claim 7, wherein the surface or subsurface comprises at least one of a surface of a roof and a subsurface of a roof.

12. The UAV assessment system of claim 7, further comprising an electronic display to display the visual presentation.

13. The UAV assessment system of claim 7, further comprising an estimation module to prepare an estimate for repairing or replacing at least a portion of the surface or subsurface.

14. A visualization system for presenting surface or subsurface analysis data captured by an unmanned autonomous vehicle (UAV) assessment system, comprising:
   a receiver to receive data from an analyzer that identifies at least two defects within a sample region of a surface or subsurface based on scan data collected by at least one sensor on an unmanned autonomous vehicle,
   wherein the sample region has a defined size characteristic comprising at least one of: a defined area, a defined diameter, a defined height, and a defined length; and
   a visualization system to generate a visual presentation for display on an electronic display, the visual presentation comprising:
      at least a portion of the surface or subsurface;
      a visible sample region overlay marking visually identifying the sample region in locational context of the displayed portion of the surface or subsurface, and
      at least two visible defect overlay markings in context of the defined size characteristic of the sample region overlay marking to identify at least some of the at least two defects identified within the sample region.

15. The UAV assessment system of claim 14, wherein the size characteristic of the sample region is based on at least one of a user-input size, perimeter, area, shape, and location.

16. The UAV assessment system of claim 14, wherein the scan data comprises visible light images captured by a visible light camera.

17. The UAV assessment system of claim 14, wherein the scan data comprises infrared images captured by an infrared camera and wherein the visual presentation further comprises a false-color representation of infrared images.

18. The UAV assessment system of claim 14, wherein the sample region is defined as a rectangle encompassing approximately 100 square-feet.

19. The UAV assessment system of claim 14, wherein the surface or subsurface comprises at least one of a surface of a roof and a subsurface of a roof.

20. The UAV assessment system of claim 14, further comprising an estimation module to prepare an estimate for repairing or replacing at least a portion of the surface or subsurface.

* * * * *